(12) United States Patent
Goncalves et al.

(10) Patent No.: US 11,597,098 B2
(45) Date of Patent: Mar. 7, 2023

(54) ASSISTIVE ROBOT SYSTEMS FOR CONTAINER LIFTING

(71) Applicant: Toyota Research Institute, Inc., Los Altos, CA (US)

(72) Inventors: Aimee S. Goncalves, Kingston, MA (US); Christopher Gidwell, Sherborn, MA (US); Joseph Bondaryk, Brookline, MA (US); Paul W. Baim, Natick, MA (US); Toffee Albina, Cambridge, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 758 days.

(21) Appl. No.: 16/560,400

(22) Filed: Sep. 4, 2019

(65) Prior Publication Data
US 2020/0206909 A1 Jul. 2, 2020

Related U.S. Application Data

(60) Provisional application No. 62/785,474, filed on Dec. 27, 2018.

(51) Int. Cl.
*B25J 9/02* (2006.01)
*B25J 15/00* (2006.01)
(Continued)

(52) U.S. Cl.
CPC ........... *B25J 15/0004* (2013.01); *B25J 5/007* (2013.01); *B25J 9/02* (2013.01); *B25J 18/025* (2013.01);
(Continued)

(58) Field of Classification Search
CPC ........ B65G 1/137; B66F 9/07513; B66F 9/08; B66F 9/183; B66F 9/20; B25J 5/007; B25J 9/02; B25J 18/025
See application file for complete search history.

(56) References Cited

U.S. PATENT DOCUMENTS 6,113,343 A 9/2000 Goldenberg et al.
6,328,120 B1 12/2001 Haeussler et al.
(Continued)

FOREIGN PATENT DOCUMENTS

CA 2949306 A1 5/2018
CN 101897641 12/2011
(Continued)

OTHER PUBLICATIONS

McGinn, Conor, et al., "Design of a terrain adaptive wheeled robot for human-orientated environments," https://link.springer.com/article/10.1007/s10514-018-9701-1; Published Date: Feb. 13, 2018.
(Continued)

*Primary Examiner* — William C Joyce
(74) *Attorney, Agent, or Firm* — Dinsmore & Shohl LLP

(57) ABSTRACT

An assistive robot system includes a lifting mechanism, a movable arm assembly, a processing device, and a non-transitory, processor-readable storage medium in communication with the processing device. The processing device transmits a command to the lifting mechanism to cause the lifting mechanism to move the movable arm assembly such that a container is gripped within the movable arm assembly, transmits a first one or more signals to the movable arm assembly to cause the movable arm assembly to extend in a system longitudinal direction such that the movable arm assembly grips the container. The movable arm assembly is positioned at a release location and transmits a second one or more signals to the movable arm assembly to cause the movable arm assembly to extend in a system lateral direction such that the container gripped within the movable arm assembly is released from the movable arm assembly at the release location.

18 Claims, 21 Drawing Sheets

(51) Int. Cl.
  *B66F 9/18* (2006.01)
  *B66F 9/20* (2006.01)
  *B25J 18/02* (2006.01)
  *B66F 9/075* (2006.01)
  *B66F 9/08* (2006.01)
  *B25J 5/00* (2006.01)

(52) U.S. Cl.
  CPC ............ *B66F 9/07513* (2013.01); *B66F 9/08* (2013.01); *B66F 9/183* (2013.01); *B66F 9/20* (2013.01)

(56) References Cited

U.S. PATENT DOCUMENTS

| | | |
|---|---|---|
| 6,523,629 B1 | 2/2003 | Buttz et al. |
| 6,644,426 B1 | 11/2003 | Larue |
| 6,896,078 B2 | 5/2005 | Wakui |
| 7,137,464 B2 | 11/2006 | Stabler |
| 7,152,869 B2 | 12/2006 | Dupay et al. |
| 7,424,923 B2 | 9/2008 | Yang et al. |
| 7,426,970 B2 | 9/2008 | Olsen |
| 7,434,638 B2 | 10/2008 | Tanielian |
| 7,475,745 B1 | 1/2009 | DeRoos |
| 7,581,746 B2 | 9/2009 | Abate et al. |
| 7,645,110 B2 | 1/2010 | Ogawa et al. |
| 7,721,829 B2 | 5/2010 | Lee et al. |
| 8,066,298 B2 | 11/2011 | Alguera et al. |
| 8,083,013 B2 | 12/2011 | Bewley et al. |
| 8,162,351 B2 | 4/2012 | Lee et al. |
| 8,307,923 B2 | 11/2012 | Lin et al. |
| 8,360,178 B2 | 1/2013 | Goldenberg et al. |
| 8,753,155 B2 | 6/2014 | Olm et al. |
| 8,840,128 B2 | 9/2014 | Glazner |
| 8,840,130 B2 | 9/2014 | Columbia |
| 8,875,815 B2 | 11/2014 | Terrien et al. |
| 8,915,692 B2 | 12/2014 | Grinnell et al. |
| 9,032,831 B2 | 5/2015 | Sutherland |
| 9,096,281 B1 | 8/2015 | Li et al. |
| 9,248,875 B2 | 2/2016 | Wolf et al. |
| 9,248,876 B2 | 2/2016 | Nuchter et al. |
| 9,283,681 B2 | 3/2016 | Slawinski et al. |
| 9,314,921 B2 | 4/2016 | Jacobsen et al. |
| 9,314,929 B2 | 4/2016 | Hyde et al. |
| 9,387,892 B2 | 7/2016 | Gettings et al. |
| 9,387,895 B1 | 7/2016 | Theobald et al. |
| 9,463,574 B2 | 10/2016 | Purkayastha et al. |
| 9,475,193 B2 | 10/2016 | Bosscher et al. |
| 9,527,213 B2 | 12/2016 | Luo et al. |
| 9,586,636 B1 | 3/2017 | Burmeister et al. |
| 9,616,948 B2 | 4/2017 | Ben-Tzvi et al. |
| 9,724,829 B2 | 8/2017 | Hyde et al. |
| 9,726,268 B1 | 8/2017 | Krasowski et al. |
| 9,776,333 B2 | 10/2017 | Sakai et al. |
| 9,808,383 B2 | 11/2017 | Mulhern et al. |
| 9,902,069 B2 | 2/2018 | Farlow et al. |
| 2003/0137268 A1 | 7/2003 | Papanikolopoulos et al. |
| 2008/0302586 A1 | 12/2008 | Yan |
| 2009/0072101 A1* | 3/2009 | Stoelinga ............ F16H 19/0663 74/89.21 |
| 2010/0025964 A1 | 2/2010 | Fisk et al. |
| 2013/0231814 A1 | 9/2013 | Sarokhan et al. |
| 2014/0379198 A1 | 12/2014 | Amino et al. |
| 2015/0336264 A1* | 11/2015 | Berger .................. B25J 9/0006 180/21 |
| 2016/0311479 A1 | 10/2016 | Rudakevych et al. |
| 2017/0066132 A1 | 3/2017 | Casey et al. |
| 2017/0280960 A1 | 10/2017 | Ziegler et al. |
| 2018/0043530 A1 | 2/2018 | Goldenberg et al. |
| 2018/0065242 A1 | 3/2018 | Tanaka et al. |
| 2018/0071909 A1 | 3/2018 | Bewley et al. |
| 2019/0232992 A1 | 8/2019 | Bondaryk et al. |

FOREIGN PATENT DOCUMENTS

| | | |
|---|---|---|
| CN | 101712199 B | 7/2012 |
| CN | 102718012 B | 11/2014 |
| CN | 203993868 U | 12/2014 |
| CN | 103568018 B | 9/2015 |
| CN | 105598937 A | 5/2016 |
| CN | 105666474 A | 6/2016 |
| CN | 105269593 B | 8/2016 |
| CN | 205441615 U | 8/2016 |
| CN | 106272478 A | 1/2017 |
| CN | 206296921 U | 7/2017 |
| CN | 107150336 A | 9/2017 |
| CN | 206748412 U | 12/2017 |
| CN | 107618026 A | 1/2018 |
| CN | 207669294 U | 7/2018 |
| CN | 108466278 A | 8/2018 |
| EP | 1290935 B1 | 9/2006 |
| JP | 2885367 B2 | 4/1999 |
| JP | 2001225754 | 8/2001 |
| JP | 2004195592 A | 7/2004 |
| JP | 2009166181 A | 7/2009 |
| JP | 2017164872 A | 9/2017 |
| WO | 2014162605 | 10/2014 |
| WO | 2017088048 | 6/2017 |
| WO | 2017191591 A1 | 11/2017 |

OTHER PUBLICATIONS

"StairKing battery powered stair climbing appliance truck," https://catalog.wescomfg.com/item/all-categories/liftkar-hd-stairking-and-stair-climbing-trucks/230051-1?plpver=1001 Accessed Date: Sep. 19, 2018.

"Toru", Sep. 19, 2018; URL: https://www.magazino.eu/toru-cube/?lang=en.

U.S. Appl. No. 16/560,252, filed Sep. 4, 2019; Inventors: Suhas Malghan et al.

The difference between cartesian, six-Axis, and SCARA robots; Published Date: Dec. 2, 2013; URL: https://www.machinedesign.com/motion-control/difference-between-cartesian-six-axis-and-scararobots.

\* cited by examiner

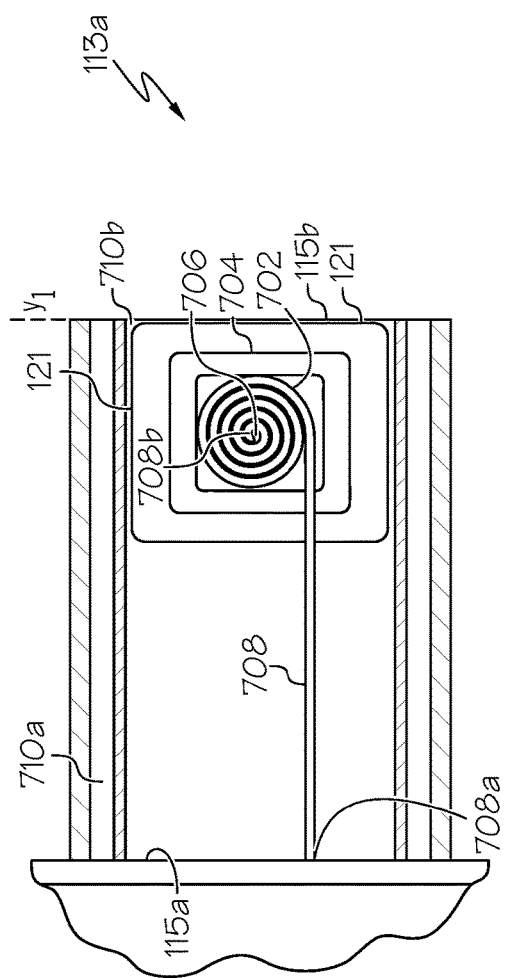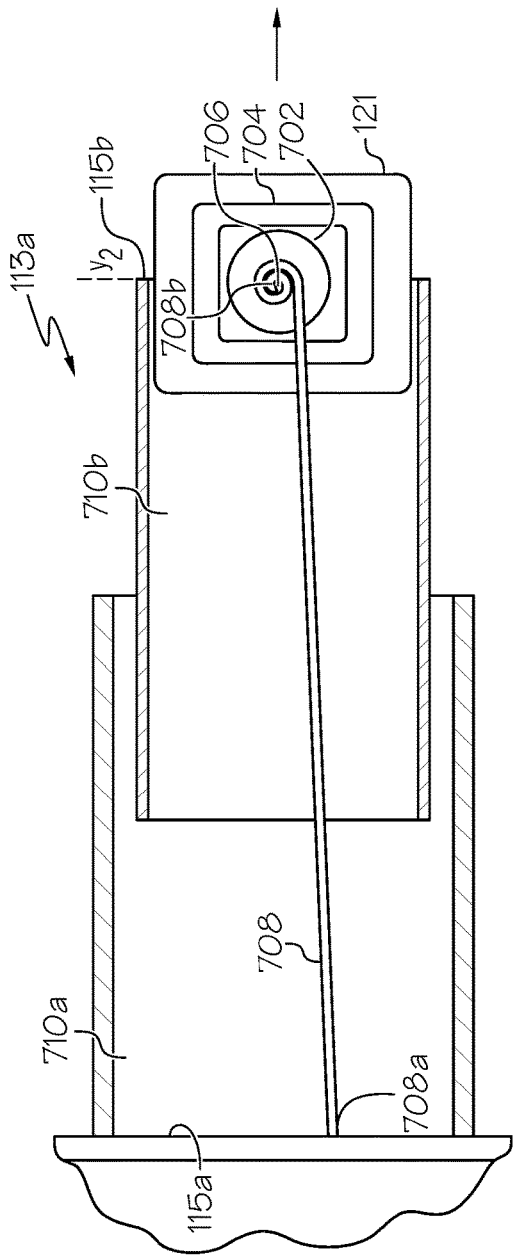
FIG. 7A
FIG. 7B

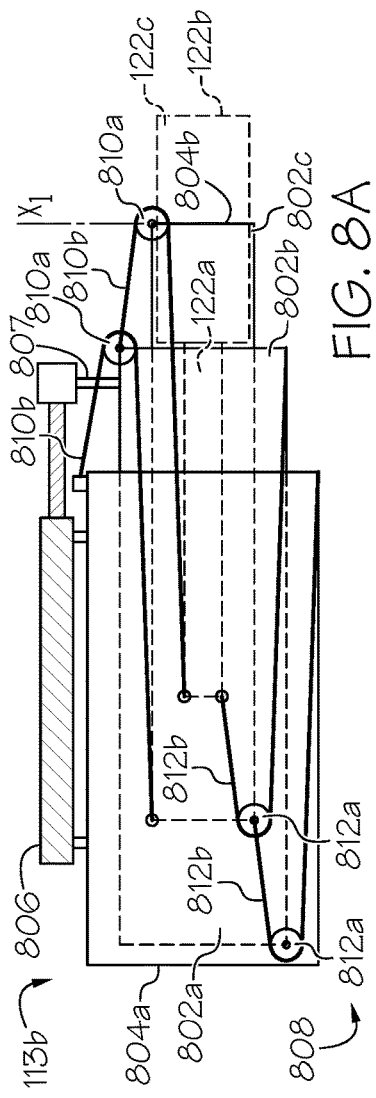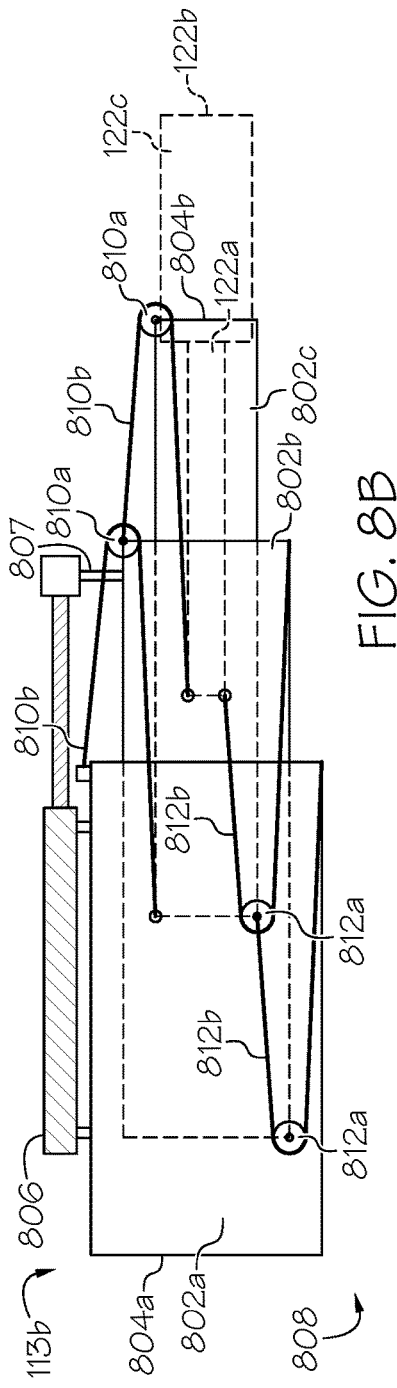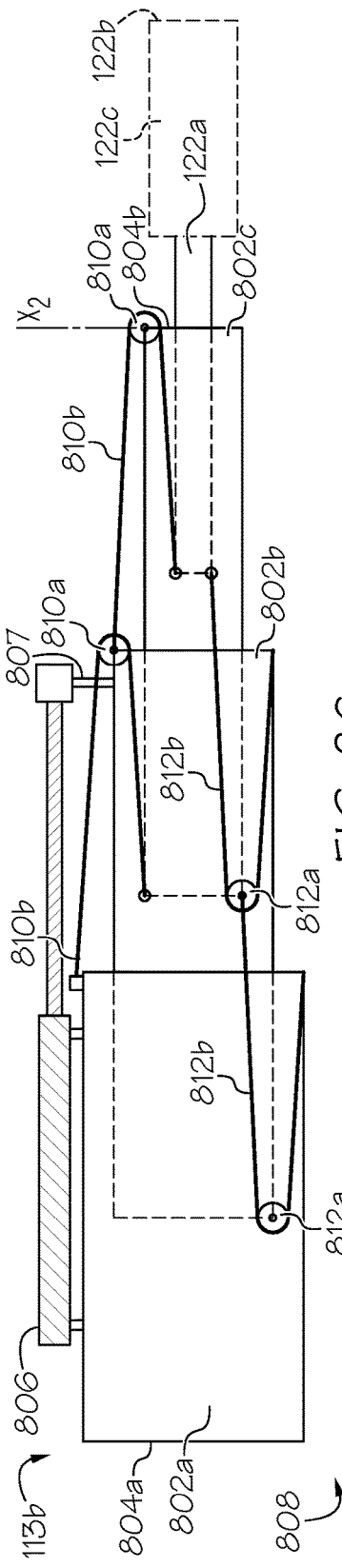

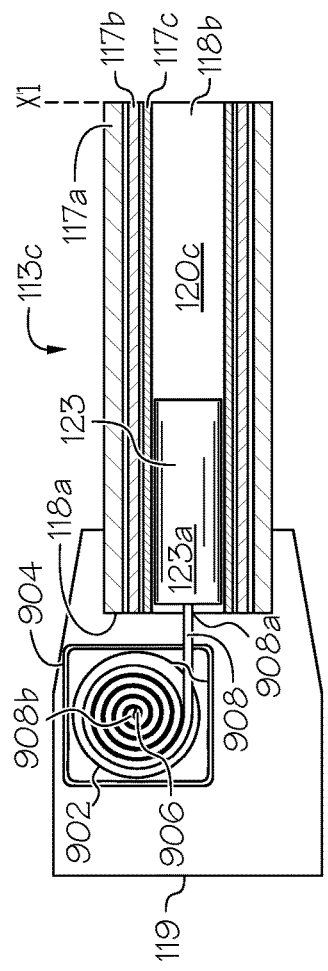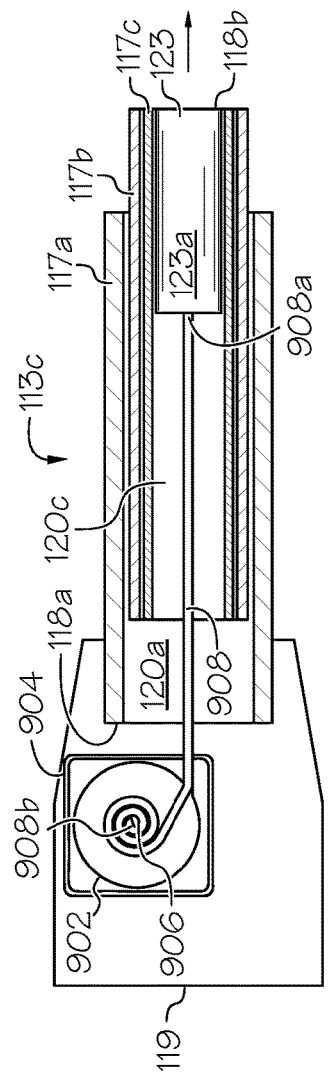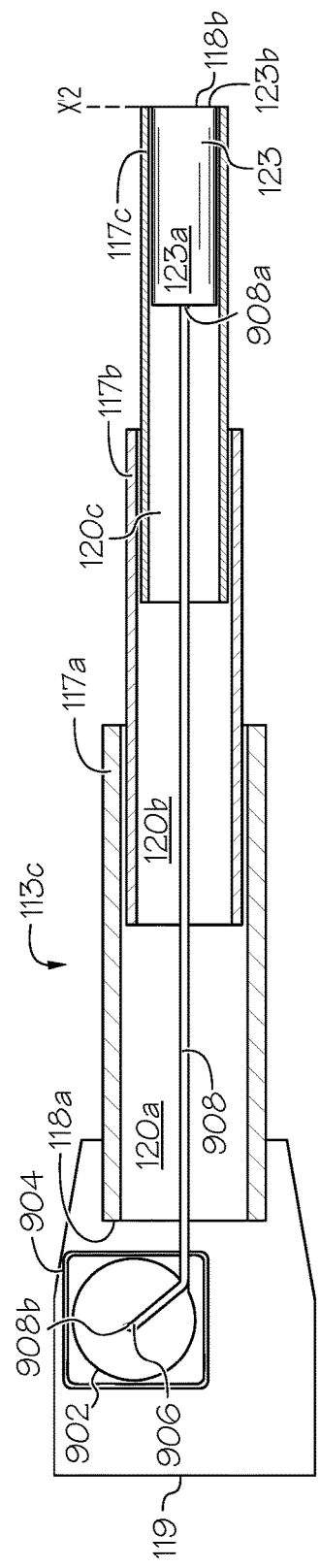

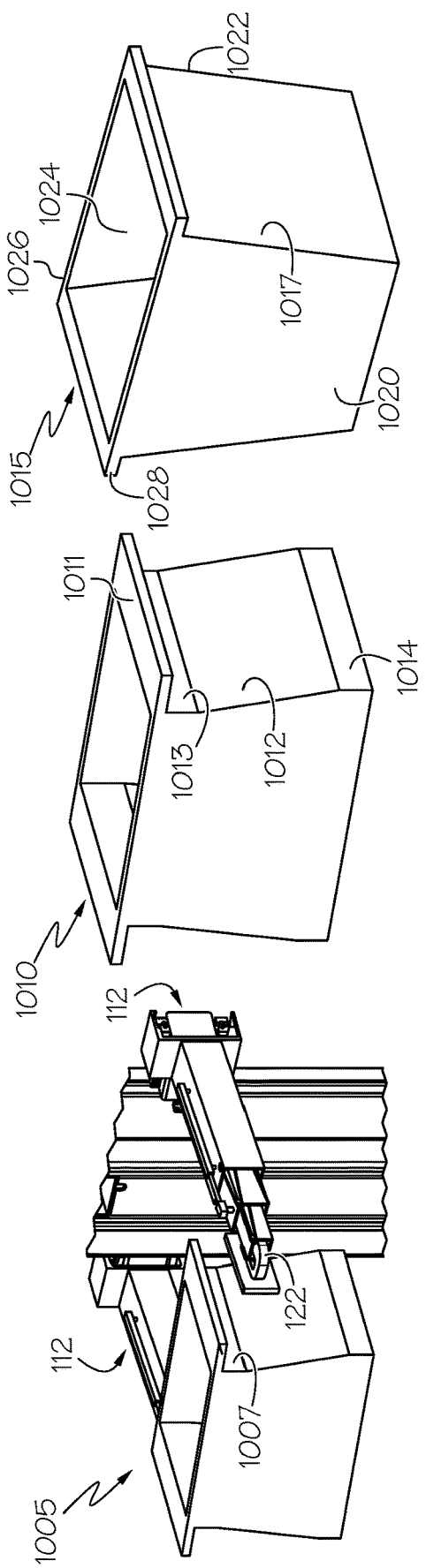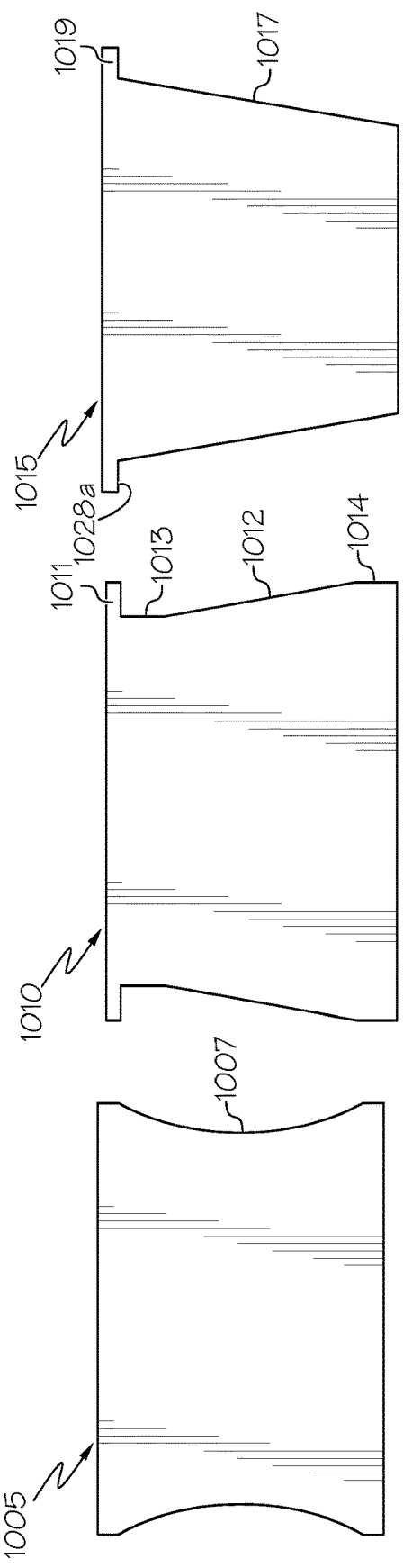

ASSISTIVE ROBOT SYSTEMS FOR CONTAINER LIFTING

CROSS REFERENCE TO RELATED APPLICATIONS

This utility patent application claims priority from U.S. Provisional Patent Application Ser. No. 62/785,474, filed on Dec. 27, 2018, the entire contents of which is incorporated herein in its entirety.

TECHNICAL FIELD

The present specification generally relates to portable robot systems and, more particularly, to assistive robot systems that grip, raise, and transport containers.

BACKGROUND

Certain people may have difficulty with transporting items, such as large, bulky and/or heavy items. For example, people may struggle with the tasks required to lift a container, transport and/or store the container, and remove the container from storage and/or place the container somewhere else such as onto a shelf. That is, people may be required to complete a number of tasks that may be physically taxing, such as lifting a container full of items and/or placing the container onto the shelf or into storage areas.

Accordingly, alternative systems for assisting users with lifting, carrying and storing containers is desired.

SUMMARY

In one embodiment, an assistive robotic system for moving a container is provided. The assistive robot system includes a lifting mechanism, a movable arm assembly coupled to the lifting mechanism via a connector, a processing device communicatively coupled to the lifting mechanism and the movable arm assembly, and a non-transitory, processor-readable storage medium in communication with the processing device. The non-transitory, processor-readable storage medium includes one or more programming instructions that, when executed, cause the processing device to transmit a command to the lifting mechanism to cause the lifting mechanism to move the movable arm assembly such that the movable arm assembly grips a container, transmit a first one or more signals to the movable arm assembly to cause the movable arm assembly to extend in a system longitudinal direction such that the container gripped within the movable arm assembly is positioned at a release location, and transmit a second one or more signals to the movable arm assembly to cause the movable arm assembly to extend in a system lateral direction such that the container gripped within the movable arm assembly is released from the movable arm assembly at the release location.

In another embodiment, an assistive robotic system is provided. The assistive robot system includes a lifting mechanism, a movable arm assembly coupled to the lifting mechanism, a sensor device that senses an area surrounding the assistive robot system, and a processing device communicatively coupled to the sensor device, the lifting mechanism, and the movable arm assembly. Data is transmitted from the sensor device to the processing device. The processing device processes the data and determines one or more movement commands, and the processing device transmits one or more signals corresponding to the one or more movement commands to cause the lifting mechanism and the movable arm assembly to move and grip a container, cause the movable arm assembly to extend in a system longitudinal direction such that the container gripped within the movable arm assembly is positioned at a release location, and cause the movable arm assembly to extend in a system lateral direction such that the container gripped within the movable arm assembly is released from the movable arm assembly at the release location.

In yet another embodiment, an assistive robotic system for transporting a container is provided. The assistive robot system includes a drive mechanism further including a motor, one or more wheels coupled to the drive mechanism that drives movement of the one or more wheels, a lifting mechanism coupled to the drive mechanism, a movable arm assembly coupled to the lifting mechanism, a processing device communicatively coupled to the lifting mechanism, the movable arm assembly and the drive mechanism, and a non-transitory, processor-readable storage medium communicatively coupled to the processing device. The non-transitory, processor-readable storage medium including one or more programming instructions stored thereon that, when executed by the processing device, cause the processing device to determine a grip positon of the container to receive the movable arm assembly, generate at least one movement command that corresponds to one or more movements for the drive mechanism, the lifting mechanism and the movable arm assembly wherein the one or more movement commands correspond to the movement command to grip the container, and transmit one or more movement commands to the movable arm assembly, the lifting mechanism and the drive mechanism, wherein the one or more movement commands correspond to the movement command to move the container in a system vertical direction. The non-transitory, processor-readable storage medium including one or more programming instructions stored thereon that, when executed by the processing device, further cause the processing device to determine a release position of the container, transmit one or more movement commands to the movable arm assembly, the lifting mechanism and the drive mechanism, wherein the one or more movement commands correspond to the movement command to transport the container, and generate at least one movement command to the movable arm assembly, the lifting mechanism and the drive mechanism, wherein the one or more movement commands correspond to the movement command to release the container.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and example in nature and not intended to limit the subject matter defined by the claims. The following detailed description of the illustrative embodiments can be understood when read in conjunction with the following drawings, wherein like structure is indicated with like reference numerals and in which:

FIG. 7A schematically depicts an isolated view of the example lateral telescoping assembly of FIG. 6 in a first position according to one or more embodiments shown and described herein;

FIG. 7B schematically depicts an isolated view of the example lateral telescoping assembly of FIG. 7A in a second position according to one or more embodiments shown and described herein;

FIG. 8A schematically depicts an isolated view of the example longitudinal telescoping assembly of FIG. 6 in a first position according to one or more embodiments shown and described herein;

FIG. 8B schematically depicts an isolated view of the example longitudinal telescoping assembly of FIG. 8A in a mid-position according to one or more embodiments shown and described herein;

FIG. 8C schematically depicts an isolated view of the example longitudinal telescoping assembly of FIG. 8A in a second position according to one or more embodiments shown and described herein;

FIG. 9A schematically depicts an isolated view of a second example longitudinal telescoping assembly in a first position according to one or more embodiments shown and described herein;

FIG. 9B schematically depicts an isolated view of the second example longitudinal telescoping assembly of FIG. 9A in a mid-position according to one or more embodiments shown and described herein;

FIG. 9C schematically depicts an isolated view of the example longitudinal telescoping assembly of FIG. 9A in a second position according to one or more embodiments shown and described herein;

FIG. 10A schematically depicts a perspective view of a first example container according to one or more embodiments shown and described herein;

FIG. 10B schematically depicts a perspective view of a second example container according to one or more embodiments shown and described herein;

FIG. 10C schematically depicts a perspective view of a third example container according to one or more embodiments shown and described herein;

FIG. 10D schematically depicts a front view of the first example container of FIG. 10A according to one or more embodiments shown and described herein;

FIG. 10E schematically depicts a front view of the second example container of FIG. 10B according to one or more embodiments shown and described herein;

FIG. 10F schematically depicts a front view of the third example container of FIG. 10C according to one or more embodiments shown and described herein;

DETAILED DESCRIPTION

The present disclosure relates generally to robot systems that raise, lower, extend, retract and/or transport objects, such as containers, thereby providing versatility in the type and transportation of the containers relative to other systems. The robot systems described herein are capable of lifting, lowering, gripping, storing, releasing and placing a plurality of containers. The robot systems described herein are not limited by this disclosure, and may generally be any robot systems configured to assist humans with everyday tasks, such as robot systems that lift and lower containers, and/or the like. The robot systems described herein generally include various components that couple/decouple the robot systems from a plurality of varied shaped containers.

Although embodiments herein are described in the context of shopping and delivery robots, embodiments are not limited thereto. For example, the robot systems described herein may be used for various healthcare purposes, manufacturing purposes, and/or the like. Further, the robot systems described herein may be used for indoor and/or outdoor applications. Other uses should generally be understood and are included within the scope of the present disclosure.

As used herein, the term "assistive robot system " refers to any robot system that is capable of raising, lowering, placing, removing, transporting, storing, gripping, releasing, and/or the like a plurality of containers. That is, the assistive robot systems described herein are not limited to robot systems that are designed for a particular use, but rather any robot system that has the container transportation capabilities as described herein.

As used herein, the term "container" refers to any object that is capable of being raised, lowered, placed, stored, transported, gripped, released, tilted, and the like, and that is capable of holding at least one article or anther object to be emptied or removed from the container during the tilting process.

Figure 1:
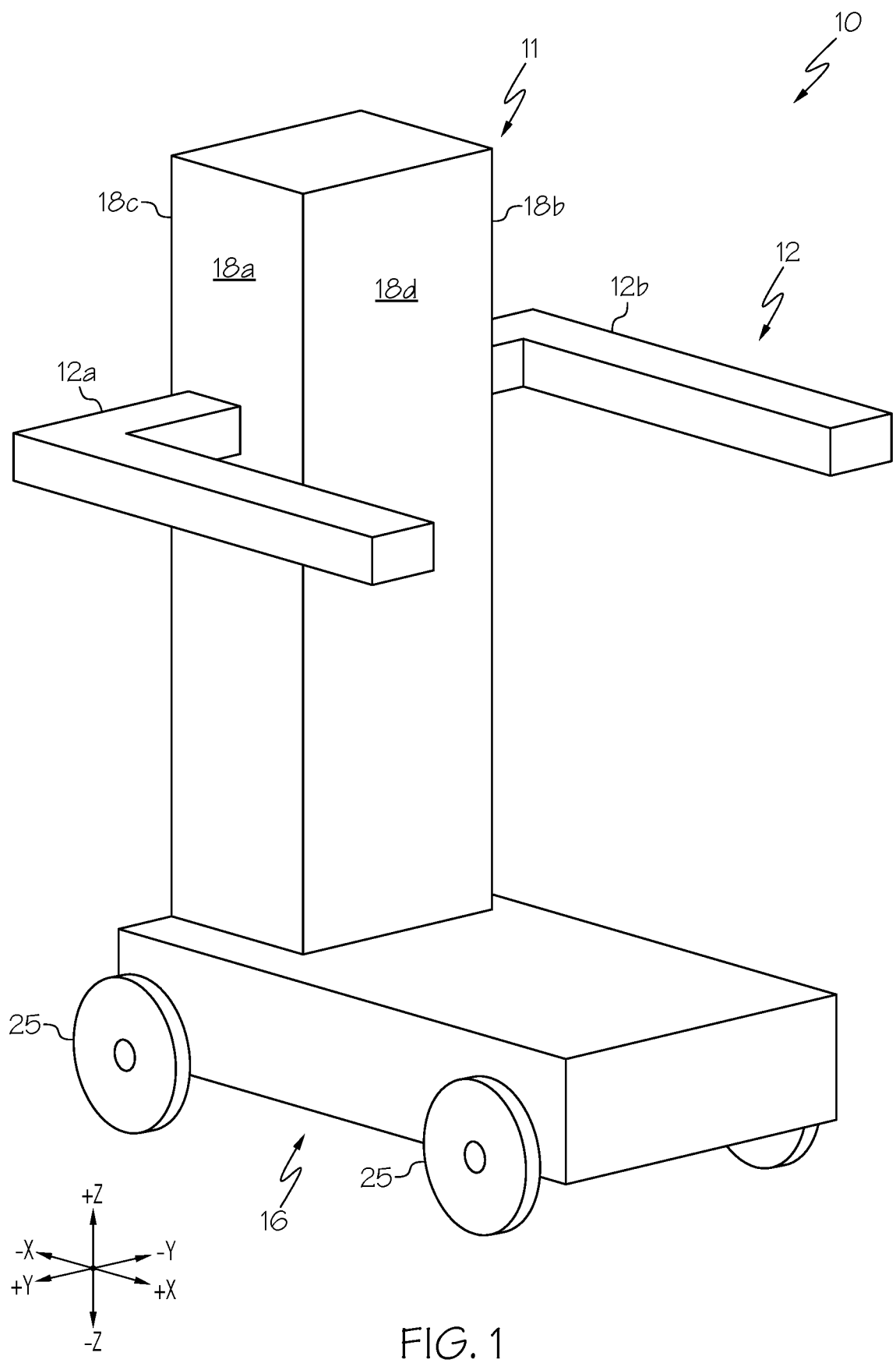
FIG. 1 depicts a perspective view of an illustrative assistive robot system according to one or more embodiments shown and described herein.

As used herein, the term "system longitudinal direction" refers to the forward-rearward direction of the system (i.e., in the +/−X direction depicted in FIG. 1). The term "system lateral direction" refers to the cross-direction (i.e., in the +/−Y direction depicted in FIG. 1), and is transverse to the longitudinal direction. The term "system vertical direction" refers to the upward-downward direction of the system (i.e., in the +/−Z direction depicted in FIG. 1). As used herein, "upper" or "top" is defined as the positive Z direction of the coordinate axis shown in the drawings. "Lower" or "bottom" is defined as the negative Z direction of the coordinate axis shown in the drawings. Further, the terms "inward", "extend", "retract", and "outward" are used to describe the relative positioning of various components of the system and/or their movements.

Referring now to the drawings, FIG. 1 depicts a perspective view of an illustrative assistive robot system 10. The illustrative assistive robot system 10 depicted in FIG. 1 may provide particular use in assisting people with moving objects, such as a plurality of containers containing a plurality of goods (e.g., groceries from a grocery store) from a first position, such as, without limitation, a floor or a lower position and moving the container, using illustrative assistive robot system 10, to position the container at a second position, such as, without limitation, a storage position on the illustrative assistive robot system 10 or placing the container an end location (e.g., a shelf raised from the floor), as described in further detail herein. However, it should be appreciated that the assistive robot system 10 is not limited to this use and may be used for other purposes without departing from the scope of the present disclosure. For example, the assistive robot system 10 may be used to provide a storage location for the plurality of containers and/or transport the plurality of containers, as described in further detail herein. In another example, the assistive robot system 10 may be used in other fields, such as the warehouse field, the manufacturing field, and/or the like.

The assistive robot system 10 generally includes an example lifting mechanism 11. The example lifting mechanism 11 is supported on a base 16. The lifting mechanism 11 may include a plurality of surfaces, including, but not limited to, a first side 18a, a second side 18b, a rear side 18c, and a front side 18d. The various surfaces of the lifting mechanism 11 may support one or more components of the assistive robot system 10, as described in further detail herein. The assistive robot system 10 further includes an example movable arm assembly 12. The example movable arm assembly 12 includes a pair of arms 12a, 12b extending from the second side 18b and the first side 18a of the lifting mechanism 11 respectively to define a gap. The example movable arm assembly 12 is configured to work in conjunction with the example lifting mechanism 11 to move in coordination such that an object, such as a container, may be gripped, raised, lowered, picked, placed, tilted, and/or the like. For example, the example lifting mechanism 11 may move in the system vertical direction (i.e., in the +/−Z direction) and the example movable arm assembly 12 may move in the system lateral direction (i.e., in the +/−Y direction) and/or the system longitudinal direction (i.e., in the +/−X direction). As such, the movement of the example movable arm assembly 12 permits for a container to be gripped, released, and the like.

The base 16 of the assistive robot system 10 may be coupled to one or more wheels 25. In some embodiments, at least one of the one or more wheels 25 may be coupled to a drive mechanism such as a motor, a transmission, and/or the like such that the wheels 25 can be rotated to move the assistive robot system 10 across a surface, as described in greater detail herein. In some embodiments, the wheels 25 may not be coupled to a drive mechanism, but rather the assistive robot system 10 is moved by receiving an external force (e.g., a user pushes or pulls the assistive robot system 10) to cause the wheels 25 to rotate and the assistive robot system 10 to move. Accordingly, it should be appreciated that the components of the assistive robot system 10 (i.e., the lifting mechanism 11, the movable arm assembly 12, and the one or more wheels 25) assist users in moving containers, transporting containers, placing containers on different surfaces, such as shelves, and the like.

Figure 2:
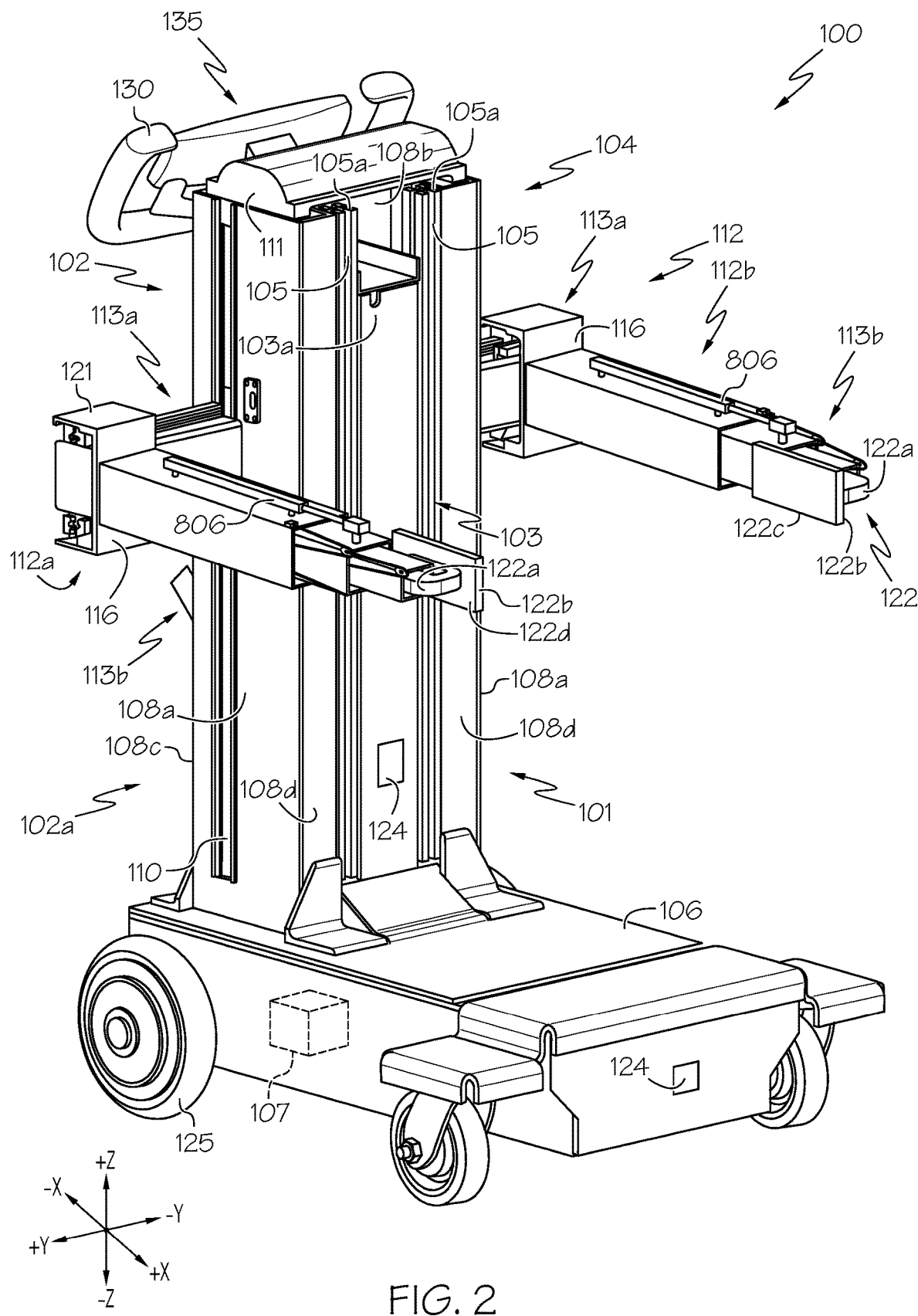
FIG. 2 depicts a perspective view of an illustrative assistive robot system according to one or more embodiments shown and described herein.

Referring now to the FIG. 2, another assistive robot system 100, according to an example embodiment, is depicted in greater detail. The illustrative assistive robot system 100 depicted in FIG. 2 may provide particular use in assisting people with moving objects, such as a plurality of containers containing a plurality of goods (e.g., groceries from a grocery store) from a first position, such as, without limitation, a floor or a lower position and moving the container, using illustrative assistive robot system 100, to position the container at a second position, such as, without limitation, a storage position on the illustrative assistive robot system 100 or placing the container at an end location (e.g., a shelf raised from the floor), as described in further detail herein. However, it should be appreciated that the assistive robot system 100 is not limited to this use and may be used for other purposes without departing from the scope of the present disclosure. For example, the assistive robot system 100 may be used to provide a storage location for the plurality of containers and/or transport the plurality of containers, as described in further detail herein. In another example, the assistive robot system 100 may be used in other fields, such as the warehouse field, the manufacturing field, and/or the like.

The assistive robot system 100 generally includes an example lifting mechanism 101. The example lifting mechanism 101 is supported on a base 106. The lifting mechanism 101 may include a plurality of surfaces, including, but not limited to, a first side 108a, a second side 108b, a rear side 108c, and a front side 108d. The various surfaces of the lifting mechanism 101 may support one or more components of the assistive robot system 100, as described in further detail herein. The assistive robot system 100 further includes an example movable arm assembly 112. The example movable arm assembly 112 includes a pair of arms 112a, 112b extending from the second side 108b and the first side 108a of the lifting mechanism 101 respectively to define a gap. The example movable arm assembly 112 is configured to work in conjunction with the example lifting mechanism 101 to move in coordination such that an object, such as a container, may be gripped, raised, lowered, picked, placed, tilted, and/or the like.

The example lifting mechanism 101 includes an example first tower actuator assembly 102 and an example second tower actuator assembly 104 spaced apart from one another defining a gap. In some embodiments, a mast 103 may be disposed in the gap between the first tower actuator assembly 102 and the second tower actuator assembly 104. In embodiments, the mast 103 is stationary and does not translate with the example lifting mechanism 101. In other embodiments, there may be more than two tower actuator assemblies. The lifting mechanism 101 is supported on the base 106. In some embodiments, the first and second tower actuator assemblies 102, 104 may have telescoping sections that extend from a lower section 102a, as explained in greater detail herein. Further, in some embodiments, the first and second tower actuator assemblies 102, 104 and the telescoping sections may be actuated by a single actuator. In other embodiments, the first and second tower actuator assemblies 102, 104 and the telescoping sections may be actuated by multiple actuators. The lower section 102a includes the plurality of surfaces, including, but not limited to, the first side 108a, the second side 108b (FIG. 3), the rear side 108c, and the front side 108d. The various surfaces of the lower section 102a of the first tower actuator assembly 102 may support one or more components of the assistive robot system 100, as described in further detail herein. The first side 108a further includes a lower section slot 110. The lower section slot 110 extends vertically in the system vertical direction (i.e., in the +/−X direction) a length of the lower section 102a.

It should be appreciated that the example second tower actuator assembly 104 is a mirror image of the first tower actuator assembly 102. As such, the same element numbers are used to describe the identical mirrored components and surfaces of the second tower actuator assembly 104.

In some embodiments, the mast 103 further includes a front surface 103a separating a pair of elongated members 105. One of the pair of elongated members 105 is attached to the second side 108b of the lower section 102a of the first tower actuator assembly 102 and the other one of the pair of elongated members 105 is attached to the second side 108b of the lower section 102a of the second tower actuator assembly 104. However, it should be appreciated that the pair of elongated members are not limited to the illustrated locations and may be positioned anywhere on the first tower actuator assembly 102. The pair of elongated members 105 extend in the system vertical direction (i.e., in the +/−Z direction) the length of the lower section 102a of the first tower actuator assembly 102 and the second tower actuator assembly 104 and terminate at the base 106. In some embodiments, the lifting mechanism 101 includes a cap 111 that extends between the first and second tower assemblies 102, 104 defining a top portion of the lifting mechanism 101. As such, the elongated members 105 may extend a length of the lower section 102a between the cap 111 and the base 106. Each one of the pair of elongated members 105 further includes an elongated slot 105a that extends the length of the elongated members 105 in the system vertical direction (i.e., in the +/−Z direction), as discussed in greater detail herein. The elongated slot 105a may be a c-channel, a Unistrut, and/or the like.

Figure 4A:
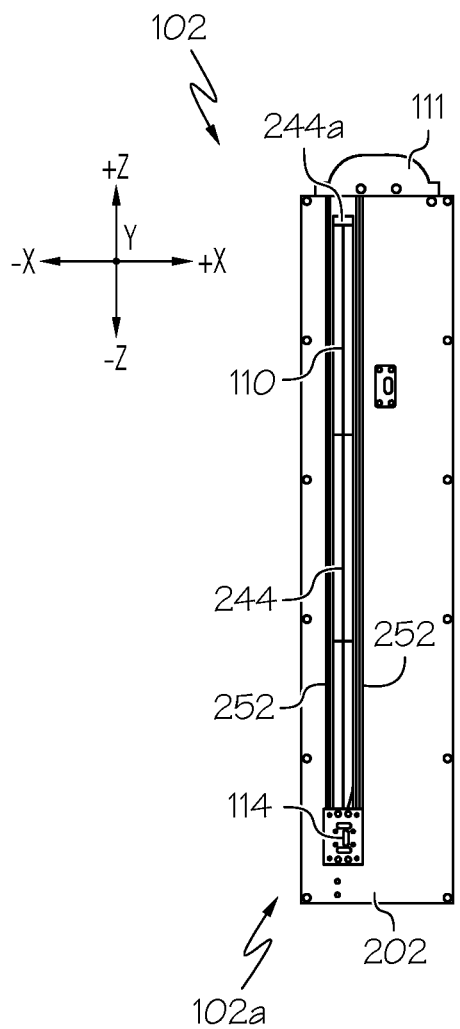
FIG. 4A schematically depicts a side view of the lifting mechanism of FIG. 3 at a home position according to one or more embodiments shown and described herein.
Figure 4B:
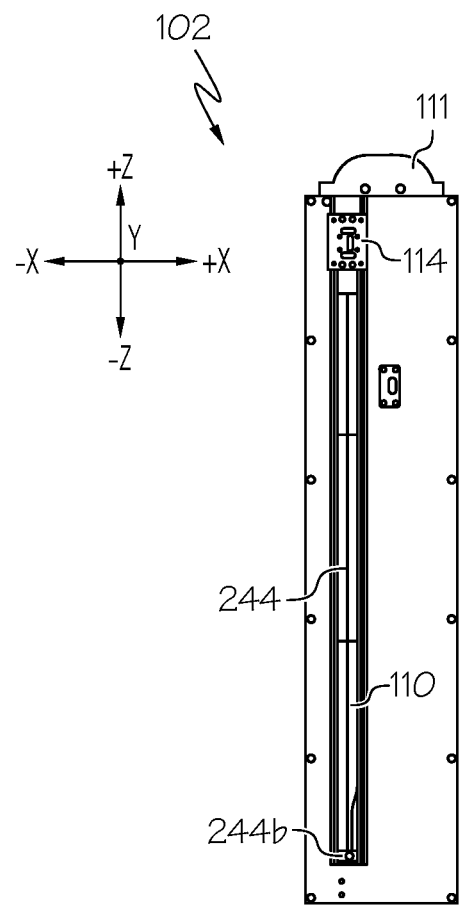
FIG. 4B schematically depicts a side view of the lifting mechanism of FIG. of FIG. 4A with a connector raised in a system vertical direction according to one or more embodiments shown and described herein.

Still referring to FIG. 2, the assistive robot system 100 includes the movable arm assembly 112. The movable arm assembly 112 includes a pair of arm 112a, 112b. Each of the pair of arms 112a, 112b may include a lateral telescoping assembly 113a, a longitudinal telescoping assembly 113b, and a housing 121 having an outer surface 116. Each one of the pair of arms 112a, 112b are operably coupled to a connector 114 (FIG. 4A) that travels within the lower section slot 110, and in some embodiments, along an extension section rail 244 (FIG. 4B), as discussed in greater detail herein. The lateral telescoping assembly 113a is operably coupled to the longitudinal telescoping assembly 113b, and vice versa. In some embodiments, the lateral telescoping assembly 113a may include a plurality of telescoping segments that travel laterally in the system lateral direction (i.e., in the +/−Y direction), as discussed in greater detail herein. Further, in some embodiments, the longitudinal telescoping assembly 113b may also include a plurality of telescoping segments that travel longitudinally in the system longitudinal direction (i.e., in the +/−X direction), as discussed in greater detail herein. In some embodiments, the plurality of telescoping segments of the longitudinal telescoping assembly 113b are driven by a linear actuator 806. Each segment of the plurality of telescoping segments have a different interior area such that each segment nests within the previous telescoping segment, as explained in greater detail below. In other embodiments, each segment of the plurality of telescoping segments are in reserve order to form a reverse pyramid shape. It should be appreciated that in either embodiment, the telescoping segments mimic a gantry crane or other mechanism configured to lift and support heavy weight with limited degrees of freedom to support the weight of the container to be raised, lowered, placed, stored, transported, and the like.

In some embodiments, an example gripping assembly 122 is coupled to the longitudinal telescoping assembly 113b. In particular, the example gripping assembly 122 includes an attachment portion 122a and a gripping portion 122b. The attachment portion 122a is configured to attach and move the gripping portion 122b such that the example gripping assembly 122 is configured to extend and retract with the telescoping segments of the longitudinal telescoping assembly 113b extend and retract, as discussed in greater detail herein. The gripping portion 122b of the example gripping assembly 122 may have an inside surface 122c and an outside surface 122d. The inside surface 122c may be configured to engage with the container while the outside surface 122d is configured to be coupled to the attachment portion 122a. The inside surface 122c of the gripping portion 122b may be configured to grip and/or retain a plurality of containers. Each container may have a different shape, as discussed in greater detail herein. As such, in some embodiments, the inside surface 122c may be a pad that is contoured, textured, and/or a combination thereof, as discussed in greater detail herein. In other embodiments, the gripping portion may be a hook, a clasp, and/or the like. The attachment portion 122a may be a U-shape or a hook shape that positions the gripping portion 122b along an inner surface of the longitudinal telescoping assembly 113b such that contact is made with the container between the arms 112a, 112b of the movable arm assembly 112, as discussed in greater detail herein.

Still referring to FIG. 2, the base 106 of the assistive robot system 100 may be coupled to one or more mobility components, such as, for example, one or more wheels 125 rotatably coupled to the base 106. In some embodiments, at least one of the one or more wheels 125 may be coupled to a drive mechanism 107 such as a motor, a transmission, and/or the like such that the wheels 125 can be rotated to move the assistive robot system 100 across a surface, as described in greater detail herein. In some embodiments, the wheels 125 may not be coupled to a drive mechanism, but rather the assistive robot system 100 is moved by receiving an external force (e.g., a user pushes or pulls the assistive robot system 100) to cause the wheels 125 to rotate and the assistive robot system 100 to move. Further, it should be appreciated that the drive mechanism 107 may include power management components, such as, a battery, a charging unit, and the like. In some embodiments, at least one of the wheels 125 may be movable around a plurality of axes such that the wheel is steerable. The wheels 125 are otherwise not limited by the present disclosure and may contain any other features. For example, the wheels 125 may be adapted for moving over varied and/or unpaved terrain, adapted for lifting the assistive robot system 100 up a single step (such as a curb or the like), adapted to move in inclement weather conditions, and/or the like. Systems and methods for traversing a step or a curb are described in U.S. patent application Ser. No. 16/560,252, which is hereby incorporated by reference in its entirety. While FIG. 2 depicts the wheels 125 as the mobility components (also FIG. 1 depicts the wheels 25), it should be appreciated that the present disclosure is not limited to such. For example, the mobility components may be skis, rotors, tracks, and/or the like that provide the assistive robot system 100 with an ability to move.

Still referring to FIG. 2, the assistive robot system 100 (as well as the assistive robot system 10 shown by FIG. 1) may include various components that allow the assistive robot system 100 to be manually pushed/pulled around a space, be semi-automatically driven by a user, and/or have autonomous movement capabilities that allow the assistive robot system 100 to move around a space with little or no input from a user. That is, the assistive robot system 100 may include components that allow for operation in a full manual mode, a manual assist mode, a semi-autonomous mode, and/or an autonomous mode, as described in greater detail herein.

Figure 6:
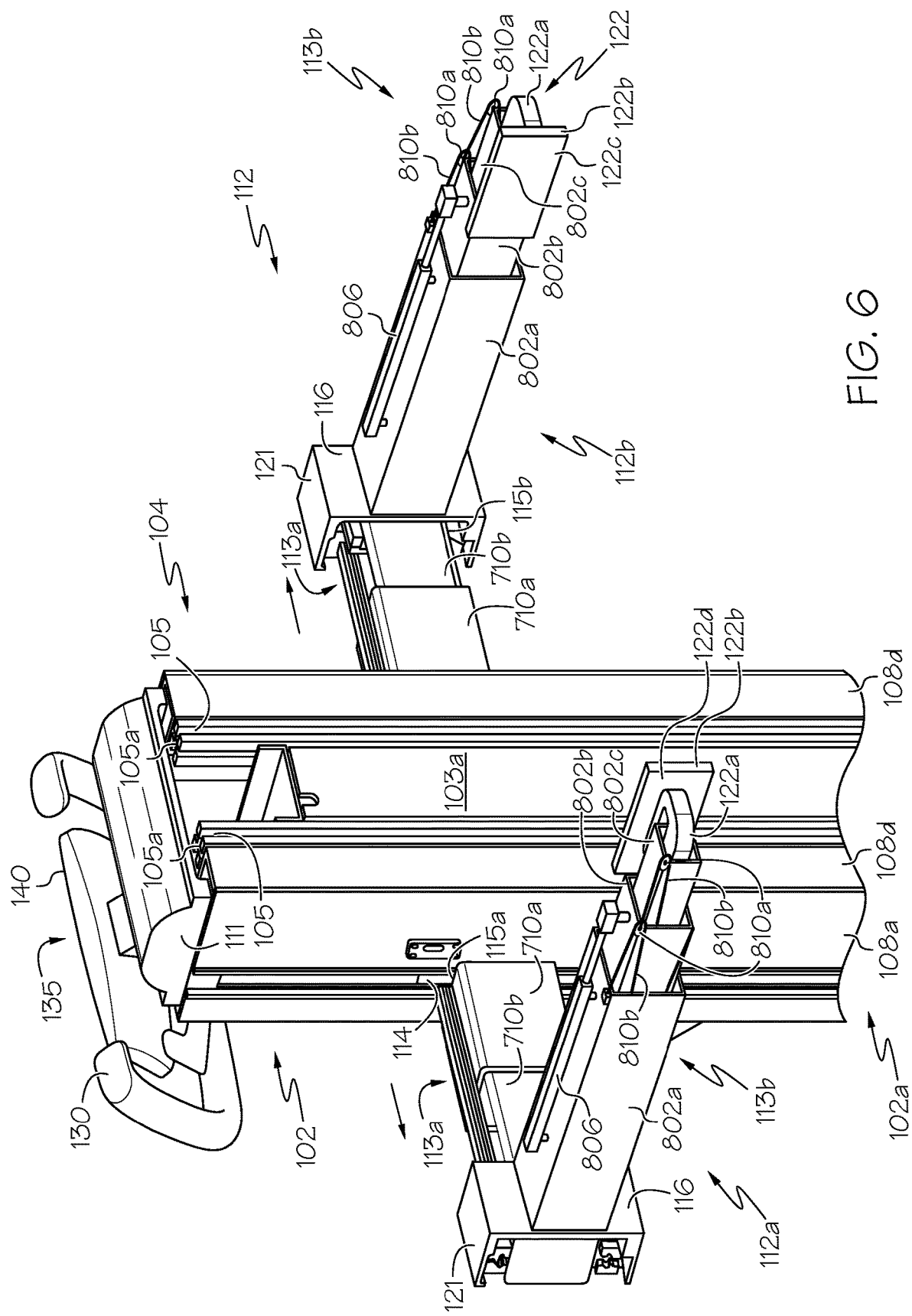
FIG. 6 schematically depicts an isolated perspective view of the movable arm assembly with an example lateral telescoping assembly in an extended position, an example longitudinal telescoping assembly in a retracted position, and a user interface device coupled to the mast according to one or more embodiments shown and described herein.

For example, in some embodiments, the assistive robot system 100 may include one or more handles 130 that are positioned and arranged for a user to grasp. That is, a user may manually push/pull the assistive robot system 100, turn the assistive robot system 100, and/or the like by applying a force to at least the one or more handles 130. As such, the one or more handles 130 may generally be located anywhere on the assistive robot system 100, particularly locations that are accessible by a user. For example, the one or more handles 130 may be located at elbow level or below for an average human such that the one or more handles 130 can be comfortably grasped by the user. In some embodiments, the one or more handles 130 may be coupled to the rear side of the lifting mechanism 101. In other embodiments, the one or more handles 130 may be coupled to a rear side of the mast 103, as depicted in FIGS. 2 and 6, as well as other locations not depicted, such as, for example, coupled to a side of the lifting mechanism 101. In some embodiments, the one or more handles 130 may be integrated with one or more portions of the assistive robot system 100 at or near the base 106 such that a user may use his or her feet to contact the one or more handles 130 to move the assistive robot system 100. In some embodiments, the one or more handles 130 may have one or more user interface hardware components (not shown) integrated therein or coupled thereto, such as touch screens, buttons, switches, joysticks, and/or the like that allow a user to navigate a user interface, to provide inputs for moving the assistive robot system 100 (e.g., to automatically or semi-automatically drive the assistive robot system 100), to lock one or more portions of the assistive robot system 100, to provide commands that allow the assistive robot system 100 to autonomously move, and/or the like. In some embodiments, the one or more user interface hardware components may be able to decouple from the one or more handles 130 such that a user may carry the one or more user interface hardware components separately from the assistive robot system 100 and use the one or more user interface hardware components to remotely control one or more aspects of the assistive robot system 100 and/or components thereof.

The assistive robot system 100 may include a sensor device 124 that includes one or more sensors positioned or mounted thereto, as shown in FIG. 2. However, the position is of the one or more sensors Is not limited to the positions as illustrated in FIG. 2. The sensor device 124 may include various components for assisting a user of the assistive robot system 100 in lifting, carrying, storing, placing and/or tilting a container such that the one or more containers may be stored and/or transported from the first position to the second position, and/or the like. Further, the sensor device 124 may assist in the semi-autonomous movement of the assistive robot system 100, assisted movement of the assistive robot system 100 in a manual assist mode, and/or the like.

In embodiments, the one or more sensors of the sensor device 124 are positioned on the assistive robot system 100 and configured to identify whether a container is stored on the assistive robot system 100. It should be appreciated that the assistive robot system 100 may change the lifting, carrying, storing, placing, extending, retracting, and/or tilting of the container when a container is in the movable arm assembly 112 and a second container is stored on the assistive robot system 100. In embodiments, the plurality of sensors of the sensor device 124 are positioned on the assistive robot system 100 and configured to identify whether the container is in a proper position to be properly retained in the movable arm assembly 112. In these embodiments, the assistive robot system 100 may change the position of the assistive robot system 100, the movable arm assembly 112, the lifting mechanism 101, prompt a user to change the position of the container, and the like, as discussed in greater detail herein.

The various components of the sensor device 124 are not limited by the present disclosure, and may generally be any components that provide the functionality described herein. For example, the sensor device 124 may include one or more sensing devices, including cameras, optical sensors, ranging systems, time of flight (TOF) sensors, proximity sensing systems, laser emitting devices, and/or the like. Such systems should generally be understood and are not described further herein. It should be understood that other embodiments do not include sensors or the sensor device 124.

Now referring to FIG. 3, an isolated perspective semi-exploded sectional view of the example first tower actuator assembly 102 of the lifting mechanism 101 will now be described. It should be appreciated that, as discussed above, the second tower actuator assembly 104 is a mirror image of the first tower actuator assembly 102 and thus will not be described. In embodiments, the first tower actuator assembly 102 includes telescoping sections. The example first tower actuator assembly 102 includes three telescoping sections: the lower section 102*a*, a midsection 102*b*, and an extension section 102*c*. As discussed above, the lower section 102*a* includes the first side 108*a* spaced apart from the second side 108*b*, the rear side 108*c* also spaced apart from the front side 108*d* so to form a lower section base portion 202 and a lower section cavity 204. The lower section base portion 202 is in contact with the base 106.

In some embodiments, the lower section cavity 204 further includes a plurality of surfaces, including, but not limited to, a lower section cavity first inner side 204*a*, a lower section cavity second inner side 204*b*, a lower section cavity third inner side 204*c*, and a lower section cavity fourth inner side 204*d*. The various surfaces of the lower section cavity 204 house the midsection 102*b* and the extension section 102*c*. As such, the lower section cavity 204 extends from the lower section base portion 202 to a lower section upper opening 206, opposite the lower section base portion 202 in the system vertical direction (i.e., in the +/−Z direction). In embodiments, the front side 108*d* of the lower section 102*a* further includes a groove 208 that extends the length of the front surface 108*d* of the lower section 102*a* in the system vertical direction (i.e., in the +/−Z direction). The groove 208 encroaches on the lower section cavity 204 such that the lower section cavity 204 may have an asymmetrical or irregular shape. In embodiments, a lower section rail 210 is mounted to the lower section cavity second inner side 204*b* and extends the length of the lower section cavity second inner side 204*b* in the system vertical direction (i.e., in the +/−Z direction). In some embodiments, the lower section rail 210 includes a lower section rail stop limit 210*a* adjacent to the lower section upper opening 206. The lower section rail stop limit 210*a* may be generally a u-shaped stop that abuts the lower section rail 210 and the lower section cavity second inner side 204*b*. The lower section rail stop limit 210*a* may be any material that is capable of preventing a movement of another section of the first tower actuator assembly 102 from travelling or telescoping beyond on the limit stop. In some embodiments, the lower section rail stop limit 210*a* may be an electrically controlled switch, such as a toggle switch, a proximately switch, a laser switch, and/or the like.

In some embodiments, the illustrated lower section cavity 204 maintains a first sprocket 211, a second sprocket 212, and a third sprocket 214, as discussed with greater detail herein. More specifically, the first, second, and third sprockets 211, 212, 214 may be mounted to the lower section cavity second inner side 204*b*.

Figure 3:
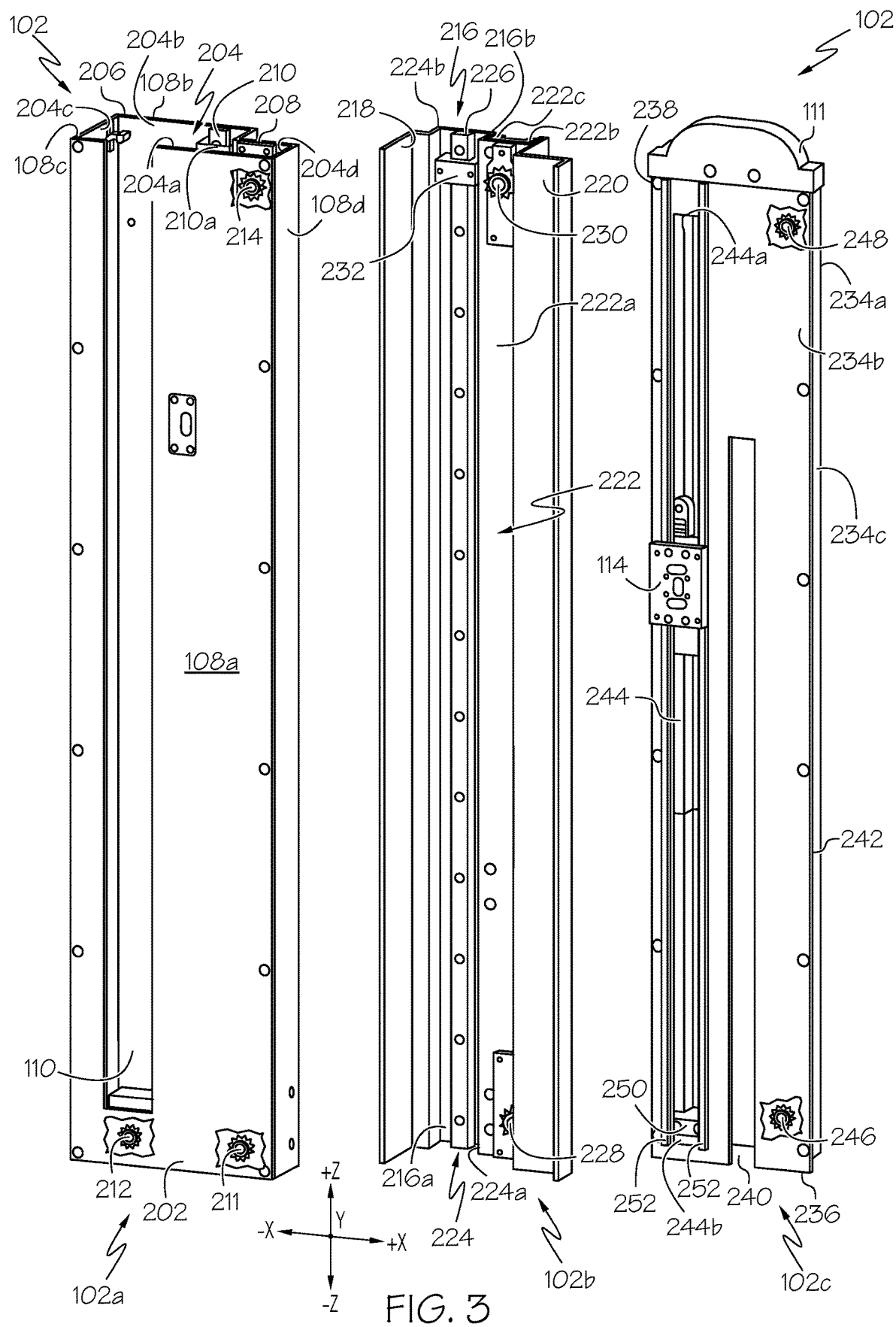
FIG. 3 depicts an isolated perspective exploded view of an example lifting mechanism of the illustrative assistive robot system of FIG. 2 according to one or more embodiments shown and described herein.

Still referring to FIG. 3, in some embodiments, the midsection 102*b* further includes a plurality of surfaces, including, but not limited to, a midsection wall 216 having a midsection wall inner surface 216*a* and a midsection wall outer surface 216*b*, a midsection first flange 218, a midsection second flange 220, and a midsection u-shaped flange 222. The midsection wall 216 is attached to the midsection first flange 218 and the midsection u-shaped flange 222 so to space apart the midsection first flange 218 from the midsection u-shaped flange 222. As such, a midsection channel 224 is defined within the midsection wall inner surface 216*a*, which in turn forms an inner surface of the midsection channel 224. The midsection first flange 218 and the midsection u-shaped flange 222 continue to form the walls of the midsection channel 224 respectively. The midsection second flange 220 is connected to the midsection u-shaped flange 222 opposite of the midsection wall 216 connection to the midsection u-shaped flange 222. That is, the midsection second flange 220 is outside of the midsection channel 224. Further, the midsection channel 224 includes a midsection channel base portion 224*a* and a midsection channel upper portion 224*b*. It should be appreciated that the example first tower actuator assembly 102 of the lifting mechanism 101 is not limited to the configuration as illustrated in FIG. 3 and that the example first tower actuator assembly 102 may take on any shape or structure and is not limited by the disclosure herein.

In some embodiments, the various surfaces of the midsection 102*b* align with the lower section cavity 204 such that the midsection 102*b* is housed within and extends from the lower section cavity 204 in the system vertical direction (i.e., in the +/−Z direction), as will be discussed in further detail herein. A midsection rail 226 is mounted to the midsection wall inner surface 216*a* and extends the length of the midsection channel 224 in the system vertical direction (i.e., in the +/−Z direction). Further, the midsection rail 226 aligns vertically with the lower section slot 110 in the system vertical direction (i.e., the +/−Z direction) so that when extended, the midsection rail 226 and the lower section slot 110 are continuous in the system vertical direction (i.e., in the +/−Z direction). Further, the midsection u-shaped flange 222 includes an outer portion 222*a* and an inner portion 222*b* that form the u-shape. As such, the inner portion 222*b* of the midsection u-shaped flange 222 aligns with and slidably engages with the lower section rail 210 in the system vertical direction (i.e., in the +/−Z direction) so that the midsection 102*b* may raise and lower from and into the lower section 102*a* by slidably engaging the midsection u-shaped flange 222 with the lower section rail 210. Moreover, the inner portion 222*b* of the midsection u-shaped flange 222 includes a u-shape flange stop limit 222*c* adjacent to both the midsection channel base portion 224*a* and the midsection channel upper portion 224*b*. The u-shape flange stop limit 222*c* may be any material that is capable of preventing a movement of another section of the first tower actuator assembly 102 from travelling or telescoping beyond on the limit stop. In some embodiments, the u-shape flange stop limit 222*c* may be an electrically controlled switch, such as a toggle switch, a proximately switch, a laser switch, and/or the like.

Still referring to FIG. 3, in some embodiments, the midsection second flange 220 may be configured to allow clearance to the first and third sprockets 211, 214 of the lower section 102*a* in the system vertical direction (i.e., in the +/−Z direction) so that when the midsection 102*b* rises and lowers from and into the lower section 102*a*, there will not be any interference with the operation of the first and third sprockets 211, 214 of the lower section 102*a*.

In some embodiments, a fourth sprocket 228 and a fifth sprocket 230 are attached to the midsection u-shaped flange 222 of the midsection 102*b* and assist in raising and lowering the midsection 102*b* from the lower section cavity 204, as discussed with greater detail herein. More specifically, the fourth and fifth sprockets 228, 230 are attached to the outer portion 222*a* of the midsection u-shaped flange 222. Further, a midsection limit stop 232 is coupled to an upper portion of midsection rail 226. The midsection limit stop 232 may be generally a u-shaped stop that abuts the midsection rail 226 and the midsection wall inner surface 216a. The midsection limit stop 232 may be any material that is capable of preventing a movement of another section of the first tower actuator assembly 102 from travelling or telescoping beyond on the limit stop. In some embodiments, the midsection limit stop 232 may be an electrically controlled switch, such as a toggle switch, a proximately switch, a laser switch, and/or the like.

Still referring to FIG. 3, in some embodiments, the extension section 102c further includes a plurality of surfaces, including, but not limited to, an extension section outer wall 234a and opposing extension section inner wall 234b. The extension section outer wall 234a and opposing extension section inner wall 234b are separated by a thickness that forms an extension section front wall 234c and an extension section rear wall 234d (FIG. 3C). Further, in some embodiments, the extension section 102c includes extension base portion 236 and an extension top portion 238 in which the cap 111 of the first tower actuator assembly 102 is attached to the extension top portion 238. The extension section inner wall 234b includes an extension section slot 240 that extends in the system vertical direction (i.e., in the +/−Z direction). It should be appreciated that the extension section slot 240 may not extend the length of the extension section inner wall 234b, but may extend from the extension base portion 236 towards the extension top portion 238 without its apex in contact with the extension top portion 238. In some embodiments, the extension section outer wall 234a, the extension section front wall 234c and/or the extension section rear wall 234d may not be flush or extend to a point adjacent to the extension section inner wall 234b, thereby creating an extension section flange 242.

In some embodiments, the various surfaces of the extension section 102c align with the midsection 102b and the lower section cavity 204 of the lower section 102a such that the extension section 102c is maintained within the lower section cavity 204 and slidably extends from the lower section 102a and the midsection 102b in the system vertical direction (i.e., in the +/−Z direction), as will be discussed in further detail herein. In some embodiments, an extension section rail 244 is mounted to the extension section inner wall 234b and extends the length of the extension section inner wall 234b in the system vertical direction (i.e., in the +/−Z direction). The extension section rail 244 has an upper edge rail portion 244a and a lower edge rail portion 244b. Further, the extension section rail 244 aligns vertically with the midsection rail 226 and the lower section slot 110 in the system vertical direction (i.e., in the +/−Z direction) so that when extended, the extension section rail 244, the midsection rail 226 and the lower section slot 110 are continuous in the system vertical direction (i.e., the +/−Z direction). In some embodiments, a pair of ribs 252 are separated by the extension section rail 244. The pair of ribs 252 protrude from the extension section inner wall 234b and extend from the extension base portion 236 to the extension top portion 238 in a system vertical direction (i.e., in the +/−Z direction). The pair of ribs 252 may shield or protect the extension section rail 244, may assist in aligning or maintain the alignment of the extension section 102c to the midsection 102b, provide strength and support to the connector 114 as well as provide a surface for the connector 114 to travel, move, and/or ride thereon during movement in the system vertical direction (i.e., in the +/−Z direction) between the upper edge rail portion 244a and a lower edge rail portion 244b. It should be appreciated that the example first tower actuator assembly 102, including the lower section 102a, the midsection 102b and the extension section 102c, is not limited to the configuration of the embodiments as illustrated in FIG. 3 and that the example first tower actuator assembly 102 may take on any shape or structure and is not limited by the disclosure herein.

Still referring to FIG. 3, in some embodiments, the extension section flange 242 may align with the fourth and fifth sprockets 228, 230 of the midsection 102b in the system vertical direction (i.e., in the +/−Z direction) so that the extension section 102c may raise and lower from the midsection 102b without interfering with the operation of the fourth and fifth sprockets 228, 230 of the midsection 102b.

In the illustrated embodiment, a sixth sprocket 246 and a seventh sprocket 248 are attached to an inside surface of the extension section outer wall 234a and assist in raising and lowering the extension section 102c from the midsection 102b and the lower section cavity 204, as discussed with greater detail herein. Further, an extension section limit stop 250 is coupled to the lower edge rail portion 244b of the extension section rail 244. The extension section limit stop 250 may be generally a u-shaped stop that abuts the lower edge rail portion 244b of the extension section rail 244 and the extension section inner wall 234b. The extension section limit stop 250 may be any material that is capable of preventing a movement of another section of the first tower actuator assembly 102 from travelling or telescoping beyond on the limit stop or used to temporarily lock the extension section 102c to the midsection 102b at a predetermined position during the extension process, as discussed in greater detail herein. The extension section limit stop 250 may be an electrically controlled switch, such as a toggle switch, a proximately switch, a laser switch, and/or the like. Further, it should be appreciated that the limit stops 210a, 222c, 232, 250 are not limited by the placement as illustrated in FIG. 3 and may be placed anywhere on the plurality of surfaces as appreciated by one skilled in the art.

It should be appreciated that the example first tower actuator assembly 102 make take on any shape or structure and is not limited by the disclosure herein. Further, the example first tower actuator assembly 102 may have a plurality of telescoping sections, which may have any shape or structure and is not limited by the disclosure herein. Further, in some embodiments, the example lifting mechanism 101 is a single tower assembly that has fewer telescoping sections than that of the first tower actuator assembly 102 and the second tower actuator assembly 104 described herein. It should be appreciated that the single tower assembly embodiment may provide more stability and may lift heavier loads than the other embodiments described herein with respect to the first tower actuator assembly 102 and the second tower actuator assembly 104. It should be appreciated that, in embodiments, the telescoping sections of the single tower assembly may be an inverted pyramid or may be a telescoping box structure.

Still referring to FIG. 3 and now also referring to FIGS. 4A-4D which schematically depict isolated side views of the first tower actuator assembly 102 and the corresponding the telescoping sections in various positions. In embodiments, the connector 114 is slidably engaged with the extension section rail 244 between the upper edge rail portion 244a and a lower edge rail portion 244b. Further, the connector 114 may travel in the system vertical direction (i.e., in the +/−Z direction) within the lower section slot 110 when the midsection 102b and the extension section 102c are at a first position, as discussed in greater detail herein. Further, in some embodiments, the connector 114 is mechanically coupled to a continuous member 302 (FIG. 5A) that is configured to raise and lower the connector 114 along the extension section rail 244 between the upper edge rail portion 244a and a lower edge rail portion 244b, as will be discussed in greater detail herein. Consequently, because the movable arm assembly 112 is mechanically coupled to the connector 114, when the connector 114 is raised or lowered along the extension section rail 244, whether while within the lower section slot 110 and/or when the extension section 102c is extended from the lower section 102a in the system vertical direction (i.e., in the +/−Z direction), the movable arm assembly 112 also travel the same distance in the system vertical direction (i.e., in the +/−Z direction).

Still referring to FIGS. 4A-4D, in some embodiments, the lower section 102a, the midsection 102b, and the extension section 102c are all depicted as being in the first position, also referred to herein as a home position. In this first position, the midsection 102b and the extension section 102c are housed within the lower section 102a. The connector 114 may travel within the lower section slot 110 along the extension section rail 244 between the upper edge rail portion 244a and the lower edge rail portion 244b from a position adjacent to the lower section base portion 202 to an upper position in which the connector 114 makes contact with the upper edge rail portion 244a of the extension section rail 244. It should be appreciated that, in embodiments, the extension section 102c is positioned ahead of, or in front of the midsection 102b within the lower section 102a in the positive system lateral direction (i.e., in the +Y direction) such that the extension section rail 244 and the connector 114 are always accessible in the lower section slot 110. Further, in this arrangement, when the connector 114 makes contact with the upper edge rail portion 244a (FIG. 2) of the extension section rail 244, the extension section 102c is driven or raised in the system vertical direction (i.e., in the +/−Z direction).

Figure 4C:
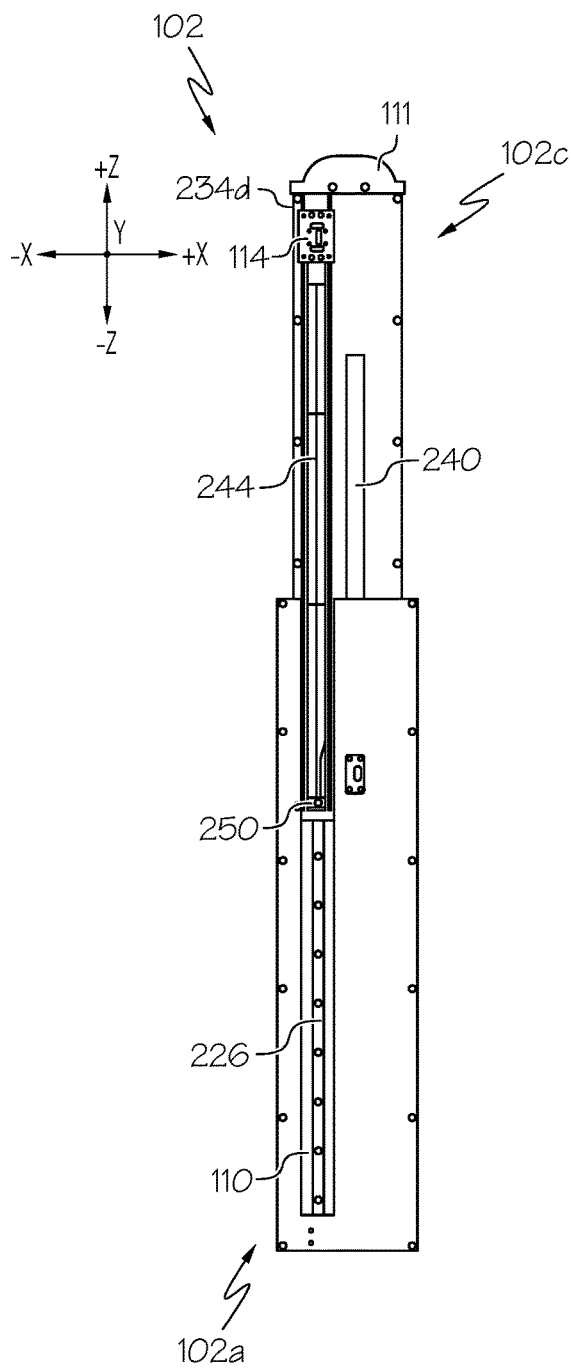
FIG. 4C schematically depicts a side view of the lifting mechanism of FIG. 4A with an extension section raised in the system vertical direction according to one or more embodiments shown and described herein.

Now referring to FIG. 4C, in some embodiments, the connector 114 makes contact with the upper edge rail portion 244a (FIG. 2) of the extension section rail 244. As a result, when the continuous member 302 (FIG. 5A, described below) continues to rotate, the connector 114 drives or raises the extension section 102c from the lower section 102a in the system vertical direction (i.e., in the +/−Z direction), as explained in greater detail below. As such, the extension section 102c will continue to raise in the system vertical direction (i.e., in the +/−Z direction) independent of the midsection 102b until the extension section limit stop 250 makes contact with the midsection limit stop 232 (FIG. 3), at which point the extension section 102c drives or raises the midsection 102b in the system vertical direction (i.e., in the +/−Z direction), as shown in FIG. 4D.

Figure 4D:
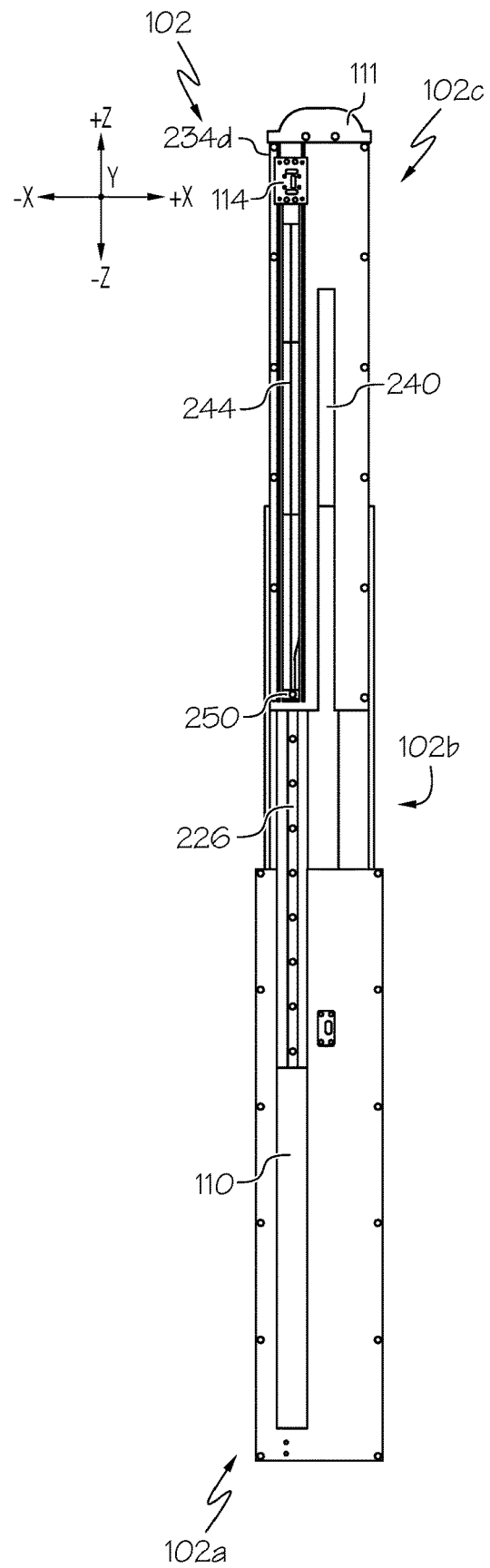
FIG. 4D schematically depicts a side view of the lifting mechanism of FIG. 4A with an extension section and a midsection raised in the system vertical direction according to one or more embodiments shown and described herein.

Now referring to FIGS. 3 and 4D, the extension section limit stop 250 makes contact with the midsection limit stop 232. As a result, the continuous member 302 continues to rotate driving or raising the extension section 102c and the midsection 102b in the system vertical direction (i.e., in the +/−Z direction) to an extended or a second position. The second position may be met when the u-shape flange stop limit 222c is in contact with the lower section rail stop limit 210a (FIG. 2). The contact between the stop limits 210a, 222c prevents the midsection 102b from raising any further in the system vertical direction (i.e., in the +/−Z direction) and the contact between the extension section limit stop 250 and the midsection limit stop 232 prevents the extension section 102c from advancing any further in the system vertical direction (i.e., in the +/−Z direction).

Referring now to FIGS. 5A-5D, a side isolated view of an example linkage assembly 300 of the first tower actuator assembly 102 that corresponds to the telescoping positions of FIGS. 4A-4D is schematically depicted. In some embodiments, the linkage assembly 300 includes the plurality of sprockets 301 and the continuous member 302. It should be appreciated that the plurality of sprockets 301 may be rollers or a combination of sprockets and rollers. The plurality of sprockets 301 of the illustrated embodiment includes the first sprocket 211, the second sprocket 212 the third sprocket 214, the fourth sprocket 228, the fifth sprocket 230, the sixth sprocket 246, and the seventh sprocket 248 described above and shown in FIG. 3. It should be appreciated that the some of the sprockets of the plurality of sprockets 301 travel, or translate, between a stop position and a travel position, while other sprockets of the plurality of sprockets 301 are fixed and do not travel. Further, in some embodiments, certain sprockets rotate whether in the stop or travel positions while others do not rotate while in the stop or travel positions. For example, the first sprocket 211, the second sprocket 212, and the third sprocket 214 of the lower section 102a are all fixed position sprockets and do not travel or move positions, and, depending on the position of the telescoping sections, may or may not rotate. It should be appreciated that the continuous member 302 may be an elongated member such as a belt, a chain, an elastic band, and the like. The continuous member 302 is a loop and does not have an end or a beginning, but in some embodiments, the ends are attached to one another to form the loop. In embodiments, the continuous member 302 selectively engages different sprockets to drive or control the telescoping sections (i.e., the midsection 102b, extension section 102c, and/or the like). In some embodiments, the first sprocket 211 is a gear driven sprocket. That is, the first sprocket 211 may be attached to an axle or some other mechanism that receives a torque from a motor (not shown) and/or the like, to drive the continuous member 302, which in turn rotates and selectively engages different sprockets, as discussed in greater detail herein. It should be appreciated that the motor may be positioned within the base 106 (FIG. 2) to help provide stability and keep the weight of the motor in the base, as appreciated by those skilled in the art, when the telescoping sections (i.e., the midsection 102b, extension section 102c, and/or the like) are extended in the system vertical direction (i.e., in the +/−Z direction). Further, in some embodiments, as discussed with respect to FIGS. 3 and 4A-4D, limit switches and/or hard stops may be used to translate the different telescoping sections (i.e., the midsection 102b, and/or the extension section 103c). In other embodiments, an encoder may be used to track the position of the motor, the continuous member 302, the sprockets, and the like to obtain precise movements of the components of the assistive robot system 100.

Figure 5A:
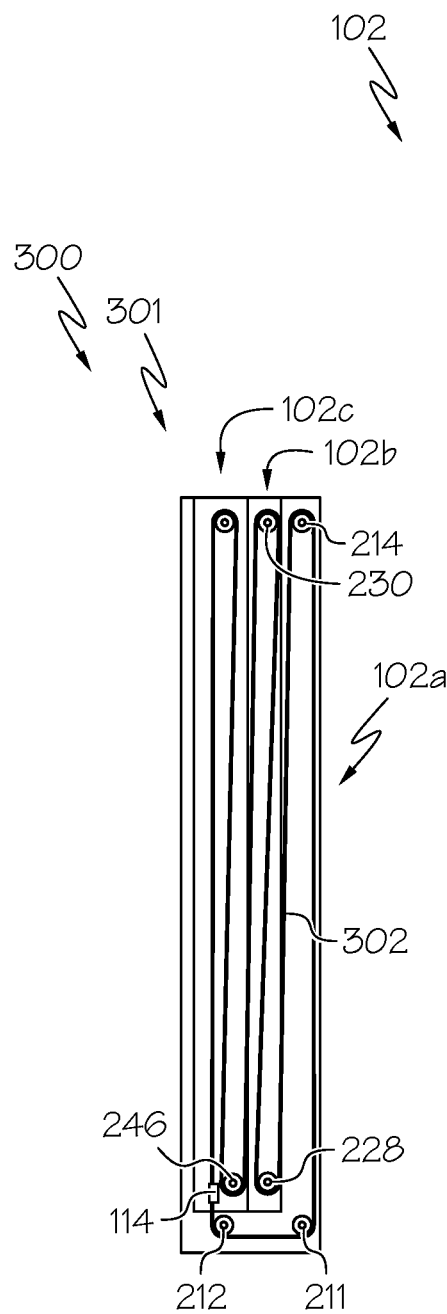
FIG. 5A schematically depicts a side isolated view of an example linkage assembly of the lifting mechanism of FIG. 4A at a home position according to one or more embodiments shown and described herein.
Figure 5B:
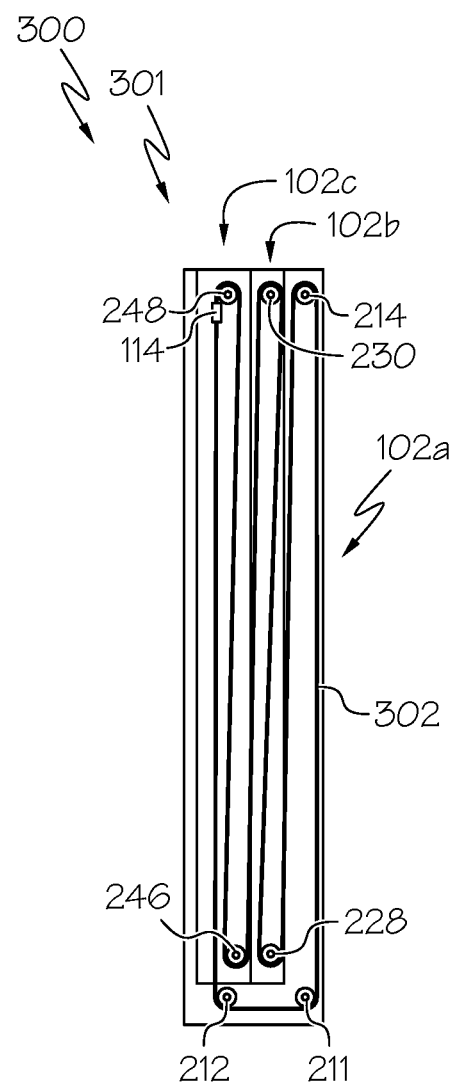
FIG. 5B schematically depicts a side isolated view of the linkage assembly of lifting mechanism of FIG. 5A with a connector raised in the system vertical direction according to one or more embodiments shown and described herein.

Referring now to FIGS. 5A-5B, the lower section 102a, the midsection 102b, and the extension section 102c are all depicted as being in the first position or home position. In this embodiment, in the first position, the midsection 102b and the extension section 102c are housed within the lower section 102a. The connector 114 may travel without making contact with the upper edge rail portion 244a (FIG. 3) of the extension section rail 244. Further, because the midsection 102b and the extension section 102c are housed within the lower section 102a, the fourth sprocket 228, the fifth sprocket 230, the sixth sprocket 246, and the seventh sprocket 248 are in their respective stop positions. In the home position, the first and second sprockets 211, 212 are positioned below any other sprockets in the system vertical direction (i.e., in the +/−Z direction) and the third, fifth, and seventh sprockets 214, 230, 248 are positioned vertically above the remaining sprockets in the system vertical direction (i.e., in the +/−Z direction). Further, the fourth and sixth sprockets 228, 246 are positioned between the first and second sprockets 211, 212 and the third, fifth, and seventh sprockets 214, 230, 248 in the system vertical direction (i.e., in the +/−Z direction). As a result of this arrangement, the continuous member 302 has slack between the plurality of sprockets, which permits the continuous member 302 to lengthen or become tight as the plurality of sprockets 301 move from their stop position to their travel position and as the telescoping sections extend between the first position and the second positon. Further, in this arrangement, each sprocket of the plurality of sprockets 301 may rotate freely because the continuous member 302 is not restricting any of their respective movements.

Figure 5C:
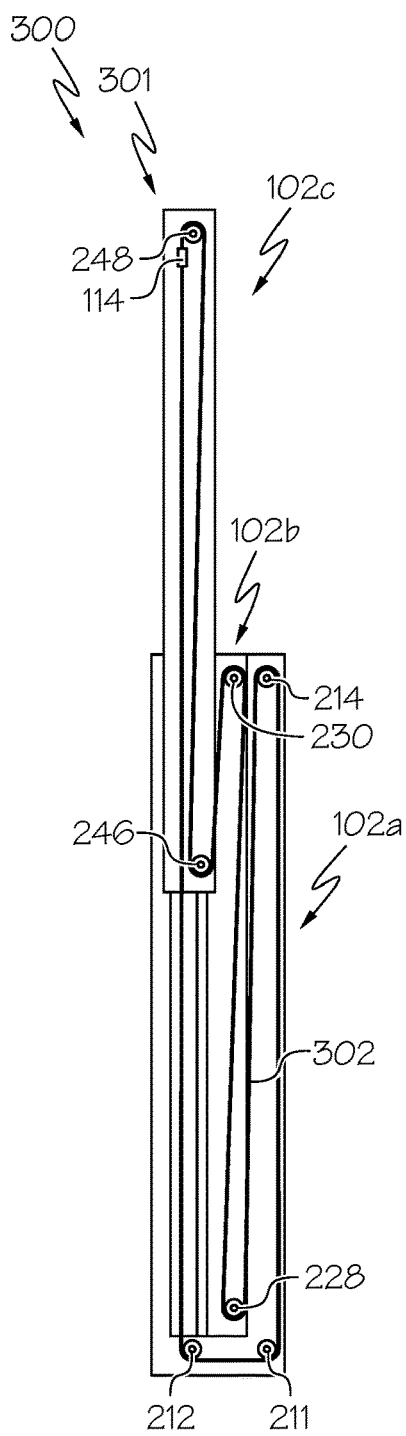
FIG. 5C schematically depicts a side isolated view of the linkage assembly of lifting mechanism of FIG. 5A with an extension section raised in the system vertical direction according to one or more embodiments shown and described herein.

Now referring to FIG. 5C, in some embodiments, the connector 114 makes contact with the upper edge rail portion 244a (FIG. 3) of the extension section rail 244 (FIG. 3). As such, the continuous member 302 has slack or is long between the second sprocket 212, the sixth sprocket 246, and the seventh sprocket 248 that allows the extension section 102c to raise in the system vertical direction (i.e., in the +/−Z direction) independent of the midsection 102b until the extension section limit stop 250 (FIG. 3) makes contact with the midsection limit stop 232 (FIG. 3). In this positon, the sixth sprocket 246 and the seventh sprocket 248 have traveled in the system vertical direction (i.e., in the +/−Z direction) from their stop position to their respective travel positions. The seventh sprocket 248, in its travel position, is vertically above the third sprocket 214 and the fifth sprocket 230 in the system vertical direction (i.e., in the +/−Z direction), while the sixth sprocket 246 is vertically above the first, second, and fourth sprockets 211, 212, 228 but is vertically below the third and fifth sprockets 214, 230 in the system vertical direction (i.e. in the +/−Z direction). As such, the continuous member 302 is now tight between the second sprocket 212, the sixth sprocket 246, and the seventh sprocket 248. In some embodiments, the continuous member 302 tightening prevents the second sprocket 212, the sixth sprocket 246, and the seventh sprocket 248 from rotation. It should be appreciated that the third sprocket 228 and the fourth sprocket 230 remain in their respective stop positions and the continuous member 302 has slack or is long between the first sprocket 211, the third sprocket 214, the fourth sprocket 228 and the fifth sprocket 230. As such, the first sprocket 211, the third sprocket 214, the fourth sprocket 228 and the fifth sprocket 230 may rotate freely in this configuration.

Figure 5D:
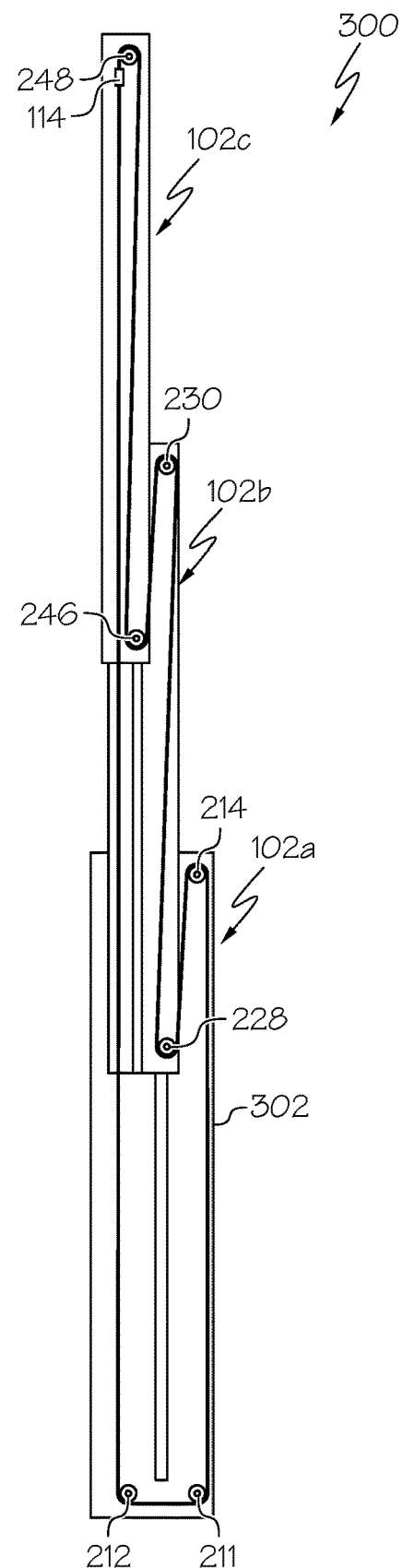
FIG. 5D schematically depicts a side isolated view of the linkage assembly of lifting mechanism of FIG. 5A with an extension section and a midsection raised in the system vertical direction according to one or more embodiments shown and described herein.

Now referring to FIG. 5D, in some embodiments, the first tower actuator assembly 102 is at the second position. That is, the extension section 102c and now the midsection 102b are raised to the full extension position in the system vertical direction (i.e., in the +/−Z direction). The slack in the continuous member 302 between the first sprocket 211, the third sprocket 214, the fourth sprocket 228 and the fifth sprocket 230 allows the midsection 102b to raise in the system vertical direction (i.e., in the +/−Z direction) while also vertically raising the extension section 102c in the system vertical direction (i.e., in the +/−Z direction). In this positon, the fourth sprocket 228 and the fifth sprocket 230 have traveled in the system vertical direction (i.e., in the +/−Z direction) from their stop position to their respective travel positions. The fifth sprocket 230, in its travel position, is vertically above the sixth sprocket 246 in the system vertical direction (i.e. in the +/−Z direction). Further the travel position of the fourth sprocket 228, while above the first and second sprockets 211, 212 may be vertically below the third sprocket 214 in the system vertical direction (i.e. in the +/−Z direction). As such, the continuous member 302 is tightened due to the displacement of the sprockets. That is, the continuous member 302 may be tightened between the first sprocket 211, the third sprocket 214, the fourth sprocket 228 and the fifth sprocket 230 and the continuous member 302 may remain tight between the second sprocket 212, the sixth sprocket 246, and the seventh sprocket 248. As such, in this configuration, the plurality of sprockets 301 may not be permitted to rotate to permit rising in the system vertical direction (i.e., in the +Z direction) because the continuous member 302 is restricting the plurality of sprockets 301 from rotation in this direction.

It should be appreciated that in addition to the example first tower actuator assembly 102 and the plurality of telescoping sections taking on any shape or structure and is not limited by the disclosure herein, the example linkage assembly 300 may make take on any shape or structure and is not limited by the disclosure herein. Further, in some embodiments, the single tower assembly has only one linkage assembly. As such, in this embodiment, the linkage assembly may be positioned in the middle of the single tower assembly and only requires one actuator.

Now referring to the FIG. 6, an isolated perspective view of the movable arm assembly 112 with the lateral telescoping assembly 113a in an extend state and a user interface device 135 coupled to the lower section 102a of the tower actuator assemblies 102, 104 are schematically depicted. The assistive robot system 100 includes the user interface device 135 having a display 140 (e.g., a touch screen display). For example, as shown in FIGS. 2 and 6, the user interface device 135 may be coupled to an upper portion of the mast 103 of the assistive robot system 100, similar to the position of the pair handles as described in detail above. However, it should be understood that such a location is merely illustrative and the user interface device 135 may be coupled to other portions of the assistive robot system 100 or may be a separate component that is not coupled to the assistive robot system 100 without departing from the scope of the present disclosure. The user interface device 135 may generally provide one or more user-facing functions, including, but not limited to, providing the user with controls for controlling movement of the assistive robot system 100 including control of movement of the movable arm assembly 112 and the base 106 and providing the user with controls for controlling settings of the assistive robot system 100, and/or the like. It should be understood that the user interface device 135 may provide other functionality not specifically described herein without departing from the scope of the present disclosure.

Referring now to FIGS. 6 and 7A-7B, the lateral telescoping assembly 113a of the movable arm assembly 112 will now be described. The lateral telescoping assembly 113a has a plurality of telescoping segments. In the illustrated embodiment, the lateral telescoping assembly 113a is two segments: a first lateral segment 710a and a second lateral segment 710b. The first lateral segment 710a has a lateral attachment end 115a that is configured to be coupled to the connector 114 (FIG. 2). The second lateral segment 710b has a lateral arm distal end 115b is coupled to and housed within a housing 121. The housing 121 is positioned laterally outwardly (i.e., in the +/−Y direction) from the first and second tower actuator assemblies 102, 104 and opposite the lateral attachment end 115a that is configured to be coupled to the connector 114 (FIG. 2). As such, the lateral telescoping assembly 113a extends laterally from the first tower actuator assembly 102 in a system lateral direction (i.e., in the +/−Y direction) and telescopes in the system lateral direction (i.e., in the +/−Y direction) between a retracted, or first position Y1 and an extended, or second position Y2. The lateral telescoping assembly 113a further includes a drum 702 and an actuator 704. The drum 702 is rotatably coupled to the actuator 704 via a connector 706 such as a shaft, a rod, and/or the like. The drum 702 is configured to rotate, in either direction, upon an activation of the actuator 704. Further, the drum 702 is configured to house a coiled member 708, such a as belt or a chain. In some embodiments, the coiled member 708 is a rigid member such as a lead screw, a rack and pinion assembly, a rigid chain, and the like. The coiled member 708 includes a first end 708a and a second end 708b. The first end 708a may be attached to the first tower actuator assembly 102 and the second end 708b may be attached to the drum 702. In some embodiments, the first end 708a of the coiled member 708 may be attached to the connector 114. The coiled member 708 may be configured to coil tightly around a circumference of the drum 702 and itself when the first lateral segment 710a and the second lateral segment 710b are in the retracted state Y1.

Conversely, the coiled member 708 may loosen and expand its coil during the unwinding or uncoiling from the drum 702 when the second lateral segment 710b is extended from the first lateral segment 710a at the second position Y2. As such, when the lateral telescoping assembly 113a is extended from the retracted position Y1 into the extended position Y2, the coiled member 708 pushes the second lateral segment 710b away from the first lateral segment 710a and the first tower actuator assembly 102. It should be appreciated that the second lateral segment 710b telescopes across a surface of the first lateral segment 710a such that the first lateral segment 710a is generally stationary and/or has less telescoping movement in the system lateral direction (i.e. in the +/−Y direction) than the second lateral segment 710b. In some embodiments, the second lateral segment 710b telescopes away from the first tower actuator assembly 102. In some embodiments, the coiled member 708 is spring loaded when coiled onto the drum 702. As such, when extending the second lateral segment 710b from the first lateral segment 710a in the system lateral direction (i.e., in the +/−Y direction), the coiled member 708 pushes the second lateral segment 710b away from the first lateral segment 710a and the first tower actuator assembly 102 using the actuator 704. During retraction, the second lateral segment 710b is retracted onto the first lateral segment 710a in the system lateral direction (i.e., in the +/−Y direction) without the need for the actuator 704. That is, the coiled member 708 may coil itself during retraction. It should be appreciated that the coiled member 708 is stiff enough to push the second lateral segment 710b away from the first lateral segment 710a and flexible enough to coil over itself onto the drum 702. Further, it should be appreciated that the coiled member 708 may self-regulate its own recoil speed based on, for example, the stiffness or rigidity of the coiled member 708. That is, the flexibility the coiled member 708 may determine the recoil speed and the strength of the coiled member 708.

Referring now to FIGS. 6 and FIGS. 8A-8C, the longitudinal telescoping assembly 113b of the movable arm assembly 112 will now be described. The longitudinal telescoping assembly 113b has a plurality of telescoping segments. In the illustrated embodiment, the telescoping segments are boxed beams that each have a different sized inner area such that each segment may nest in another telescoping segment. In some embodiments, the arrangement of each segment is an inverse pyramid. In the illustrated embodiment, the longitudinal telescoping assembly 113b is three segments: a first longitudinal segment 802a, a second longitudinal segment 802b, and a third longitudinal segment 802c. It should be understood that more or fewer segments may be provided. The first longitudinal segment 802a may include an attachment end 804a that is coupled to housing 121. In some embodiments, the attachment end 804a is coupled to the outer surface 116 of the housing 121 such that the longitudinal telescoping assembly 113b extends from the outer surface 116 of the housing 121 in a direction perpendicular to the lateral telescoping assembly 113a.

The third longitudinal segment 802c includes a distal end 804b. The longitudinal telescoping assembly 113b extends longitudinally from the lateral telescoping assembly 113a in a system longitudinal direction (i.e., in the +/−X direction) between a retracted, or first position X1 and an extended, or second portion X2. To facilitate movement, a linear actuator 806 is mounted to the first longitudinal segment 802a and operably coupled to the second longitudinal segment 802b. In some embodiments, the linear actuator 806 is coupled to the second longitudinal segment 802b via a peg 807 that extends from an outer surface of the second longitudinal segment 802b. In other embodiments, the linear actuator 806 may be coupled to the second longitudinal segment 802b by a fastener such as a bolt and nut, screws, rivets, and the like. It should be appreciated that the linear actuator 806 may be electrically driven, pneumatically driven, hydraulically driven, and the like. Further, the linear actuator 806 may be a cylinder, a motor, and the like having a shaft, a rod, and the like that moves the telescoping segments between the first position X1 and the second position X2 in a uniform movement, as discussed in greater detail herein. It should be appreciated that FIG. 8B illustrates a mid-position between the first position X1 and the second position X2, however this is not limiting and the telescoping segments may move anywhere and stop anywhere between the first position X1 and the second position X2.

Each of the telescoping segments are interconnected to the second longitudinal segment 802b via a dual pulley system 808. The dual pulley system 808 includes a plurality of pulleys 810a and a pulley member 810b for use during the extension of the longitudinal telescoping assembly 113b to the second position X2. In some embodiments, the plurality of pulleys 810a are positioned on an outer surface of each telescoping section and the pulley members 810b are routed on the outer surface of each of the telescoping segments. Further, the dual pulley system 808 includes a plurality of pulleys 812a and a pulley member 812b for use during the retraction of the longitudinal telescoping assembly 113b to the first position X1. In some embodiments, the plurality of pulleys 812a are positioned within the interior area of each telescoping section and the pulley members 812b are routed through the interior area of each of the telescoping segments. The pulley members 810b, 812b may be a chain, a belt, a rope, a string, and the like. It should be appreciated that the dual pulley system 808 works in conjunction with the linear actuator 806 such that each segment of the longitudinal telescoping assembly 113b extends and retracts in a uniform movement. It should be appreciated that FIG. 8B illustrates a mid-position between the first position X1 and the second position X2, however this is not limiting and the telescoping segments may move anywhere and stop anywhere between the first position X1 and the second position X2.

In some embodiments, when the linear actuator 806 extends in the system longitudinal direction, the pulley member 810b is moved through the plurality of pulleys 810a such that the pulley member 810b moves the telescoping segments (i.e., the second longitudinal segment 802b and the third longitudinal segment 802c). In other embodiments, when the linear actuator 806 retracts in the system longitudinal direction, the pulley member 812b is moved through the plurality of pulleys 812a such that the pulley member 812b moves the telescoping segments (i.e., the second longitudinal segment 802b and the third longitudinal segment 802c).

It should be appreciated that the box beam configuration along with the dual pulley system 808 and the nesting arrangement permit the longitudinal telescoping assembly 113b to lift, hold, lower, place, maintain, and/or the like, a plurality of containers with varying weights. That is, the assistive robot system 100 and in particular the longitudinal telescoping assembly 113b, while in both the first position X1 and/or in the second position X2 is robust such that the longitudinal telescoping assembly 113b is configured to lift, lower, tilt, and the like, containers that weigh much more that the assistive robot system 100. It should be appreciated that the longitudinal telescoping assembly 113b is not bound by the first position X1 and the second position X2 and that there are a plurality of positions therebetween that the linear actuator 806 and/or the dual pulley system 808 may position the first longitudinal segment 802a, the second longitudinal segment 802b, and the third longitudinal segment 802c.

In some embodiments, the example gripping assembly 122 is attached to the third longitudinal segment 802c and operably connected to the dual pulley system 808. A portion of the attachment portion 122a is nested within the interior area of the third longitudinal segment 802c and is configured to extend and/or retract into and out of the interior area of the third longitudinal segment 802c. In some embodiments, in operation, when the linear actuator 806 actuates the longitudinal telescoping assembly 113b and the dual pulley system 808, the attachment portion 122a extends and retracts with each of the second longitudinal segment 802b, and the third longitudinal segment 802c of the longitudinal telescoping assembly 113b in a uniform movement thereby changing or modifying the position of the gripping portion 122b. As best shown in FIG. 8A, it should be appreciated that in the first position X1, the attachment portion 122a of the gripping assembly 122, much like the third longitudinal segment 802c, is nested within the interior area of the second longitudinal segment 802b, which in turn is nested within the interior area of the first longitudinal segment 802a. In the X1 position, a portion of the gripping portion 122b is positioned along the inside surface of the third longitudinal segment 802c. In other embodiments, when the container is gripped by the movable arm assembly 112, the example gripping assembly 122 may remain in the extended position independent of the position of the telescoping segments. As such, the attachment portion 122a and/or the gripping portion 122b of the example gripping assembly 122 maintains contact with the container even when the telescoping segments are in the X1 or retracted position.

As discussed above, the inside surface 122c of the gripping portion 122b may be a pad that is be contoured, textured, and/or a combination thereof. For example, the inside surface 122c may be a pad with chevron ridges, rounded ridges, deep waves, and/or the like, configured to grip the container. In other embodiments, the gripping portion 122b may be a hook, a clasp, and/or the like, configured to grip a plurality of containers, each container having a different shape, as discussed in greater detail herein.

Referring now to FIGS. 6 and. 9A-9C, an additional or a second embodiment of the example movable arm assembly 112 will now be described. It should be appreciated that for like elements, the same reference numerals are used. In the illustrated embodiment, the example movable arm assembly 112 includes another example longitudinal telescoping assembly 113c. The longitudinal telescoping assembly 113c has a plurality of telescoping segments. In the illustrated embodiment, the longitudinal telescoping assembly 113c has three segments: a first slide segment 117a, a second slide segment 117b, and a third slide segment 117c. It should be understood that more or fewer segments may be provided. In some embodiments, the first slide segment 117a includes an attachment end 118a that is coupled to an attachment plate 119. The attachment plate 119 is mounted to the housing 121 and extends from the housing 121 such that the longitudinal telescoping assembly 113c extends from an attachment plate 119 in a direction traverse to or perpendicular to the lateral telescoping assembly 113a in the system longitudinal direction (i.e., in the +/−X direction).

The third slide segment 117c of the longitudinal telescoping assembly 113c includes a distal end 118b. The longitudinal telescoping assembly 113c is configured to move between a retracted, or first position X'1 and an extended, or second portion X'2. It should be appreciated that FIG. 9B illustrates a mid-position between the first position X'1 and the second position X'2, however this is not limiting and the telescoping segments may move anywhere and stop anywhere between the first position X'1 and the second position X'2. The longitudinal telescoping assembly 113c further includes a drum 902 and an actuator 904. The drum 902 is rotatably coupled to the actuator 904 via a connector 906 such as a shaft, a rod, and/or the like. The drum 902 is configured to rotate, in either direction, upon an activation of the actuator 904 Further, the drum 902 is configured to house a coiled member 908, such a as belt or a chain. In some embodiments, the coiled member 908 is a rigid member such as a lead screw, a rack and pinion assembly, a rigid chain, and the like. The coiled member 908 includes a first end 908a and a second end 908b. The first end 908a is attached to a second example gripping assembly 123 and the second end 908b is attached to the drum 902. In some embodiments, the first end 908a of the coiled member 908 is attached to the third slide segment 117c. In embodiments, the coiled member 908 is configured to coil tightly around a circumference of the drum 902 and itself when the longitudinal telescoping assembly 113c is in the retracted state X'1. Conversely, the coiled member 908 loosens and expands its coil during the unwinding or uncoiling from the drum 902 while the longitudinal telescoping assembly 113c is being extended into the second position X'2. As such, when extending the longitudinal telescoping assembly 113c from the retracted position X'1 into the extended position X'2, the coiled member 908 may push the second example gripping assembly 123, which in turn pulls the third slide segment 117c and the second slide segment 117b from the first slide segment 117a.

Still referring to FIGS. 6 and 9A-9C, in some embodiments, the third slide segment 117c and the second slide segment 117b telescope along a longitudinal linear rail and across an inner surface 120a of the first slide segment 117a such that the first slide segment 117a is generally stationary and/or has less telescoping movement in the system longitudinal direction (i.e. in the +/−X direction) than the third slide segment 117c and/or the second slide segment 117b. It is appreciated that the longitudinal linear rail is mounted to the inner surfaces 120a of the first slide segment 117a, and inner surfaces 120b, 120c of the second and third slide segments 117b, 117c respectively and extends a length of the inner surfaces 120a, 120b, 120c in the system longitudinal direction (i.e., in the +/−X direction). It should be appreciated that the first slide segment 117a is fixedly mounted to the attachment plate 119. It should also be appreciated that the longitudinal telescoping assembly 113c may have other configurations and that the segments may be nested in any arrangement. For example, the arrangement described herein relating to the third slide segment 117c and the second slide segment 117b telescope along the longitudinal linear rail across the inner surface 120a of the first slide segment 117a is merely one example and is non-limiting.

In some embodiments, the coiled member 908 is spring loaded when coiled onto the drum 902. As such, when extending the longitudinal telescoping assembly 113c, the coiled member 908 retracts the gripping assembly 123, the second slide segment 117b and the third slide segment 117c towards the attachment plate 119 along the longitudinal linear rail without the need for the actuator 904. It should be appreciated that the actuator 904 is used to drive or extend the second example gripping assembly 123, the second slide segment 117b, and the third slide segment 117c into the extend position X'2 along the longitudinal linear rail. Further, it should be appreciated that the coiled member 908 coils upon itself during retraction. In embodiments, the coiled member 908 is stiff enough to push or extend the second example gripping assembly 123 in the system longitudinal direction (i.e., in the +/−X direction) such that the second example gripping assembly 123 pulls the third slide segment 117c and the second slide segment 117b and is also flexible to coil over itself onto the drum 902. Further, it should be appreciated that the coiled member 908 may self-regulate its own recoil speed based on, for example, the stiffness or rigidity the coiled resilient member 908. That is, the flexibility the coiled member 908 may determine the recoil speed and the strength of the coiled resilient member 908.

Still referring to FIGS. 6 and 9A-9C, the second example gripping assembly 123 may be slidably attached to the inner surface 120c of the third slide segment 117c of the longitudinal telescoping assembly 113b along the longitudinal linear rail such that the coiled member 908 drives the second example gripping assembly 123 to extend and retract each of the second and third slide segments 117b, 117c of the longitudinal telescoping assembly 113c. When the longitudinal telescoping assembly 113c is retracted, or in the first position X'1, the second example gripping assembly 123 may be adjacent to the attachment end 118a. Conversely, when the longitudinal telescoping assembly 113c is extended, or in the second position X'2, the second example gripping assembly 123 may be adjacent to the distal end 118b.

In some embodiments, an outside surface 123b of the second example gripping assembly 123 engages with the longitudinal linear rail of the longitudinal telescoping assembly 113c. Further, in some embodiments, an inside surface 123a of the second example gripping assembly 123 may be a pad that is be contoured, textured, and/or a combination thereof. For example, the inside surface 123a may be a pad with chevron ridges, rounded ridges, deep waves, and/or the like. In other embodiments, the second example gripping assembly 123 may be a hook, a clasp, and/or the like, configured to grip a plurality of containers, each container having a different shape, as discussed in greater detail herein.

Referring now to FIGS. 10A-10F, non-limiting container shapes are illustrated and described. FIG. 10A is a perspective view of a first example container 1005 and FIG. 10D is a front view of the first example container 1005 of FIG. 10A. The first example container 1005 includes a pair of parabolic sidewalls 1007. The movable arm assembly 112 and, in particular, the gripping assembly 122 is configured to be in contact with the pair of parabolic sidewalls 1007 so to grip, raise, place, store, lower, and/or the like the container 1005.

FIG. 10B is a perspective view of a second example container 1010 and FIG. 10E is a front view of the first example container 1010 of FIG. 10B. The second example container 1010 includes a pair of modified trapezoidal sidewalls 1012 having an upper flat region 1013 and a lower flat region 1014. The movable arm assembly 112 and the gripping assembly 122 are configured to be in contact with the pair of modified trapezoidal sidewalls 1012 so to grip, raise, place, store, lower, and/or the like the container 1010.

FIG. 10C is a perspective view of a third example container 1015 and FIG. 10F is a front view of the third example container 1015 of FIG. 9A. The third example container 1015 includes a pair of trapezoidal sidewalls 1017, a front wall 1020 and a rear wall 1022 so to form a cavity 1024 having an opening 1026. A lip portion 1028 surrounds the circumference of the opening 1026. The movable arm assembly 112 and the gripping assembly 122 are configured to be in contact with the pair of trapezoidal sidewalls 1017 so to grip, raise, place, store, lower, and/or the like the container 1015.

Figure 11A:
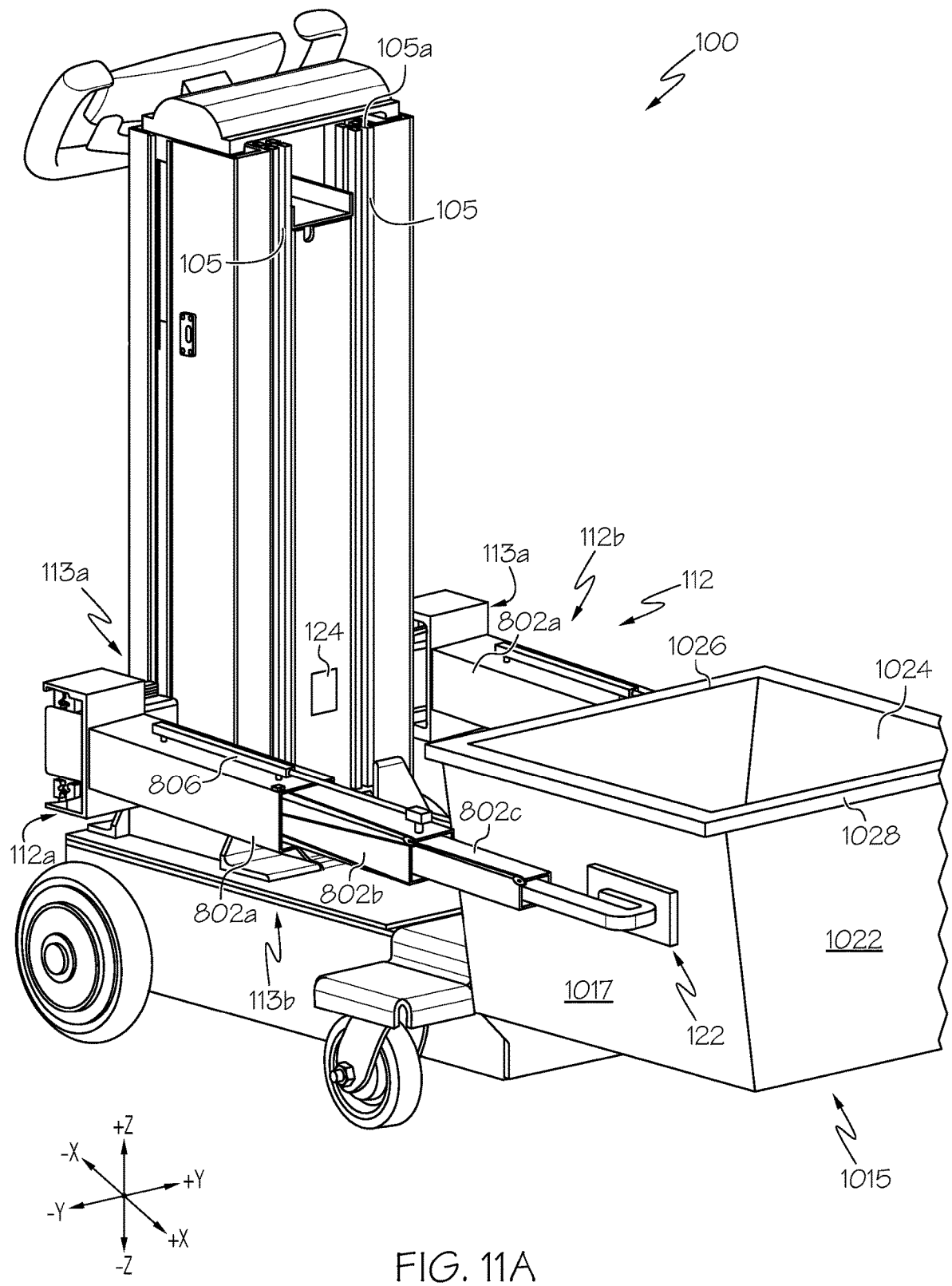
FIG. 11A depicts a perspective view of an illustrative assistive robot system gripping a container according to one or more embodiments shown and described herein.

Now referring to FIGS. 11A-11E, an example container movement by the assistive robot system 100 is schematically depicted. With reference to FIG. 11A, the assistive robot system 100 is illustrated gripping the third example container 1015 by the gripping assembly 122 of each of the pair of arms 112a, 112b of the example movable arm assembly 112. It should be appreciated that the container 1015 is not limited to the third example container 1015, but may be the second example container 1010 (FIG. 10B), the first example container 1005 (FIG. 10A), and/or any other container or object shape. In the illustrated embodiment, the container 1015 begins on a floor surface. However, this is non-limiting and the container may be gripped from any height in the system vertical direction (i.e., in the +/−Z direction) that is within reach of the example gripping assembly 122 of the movable arm assembly 112 and the lifting mechanism 101.

Figure 11B:
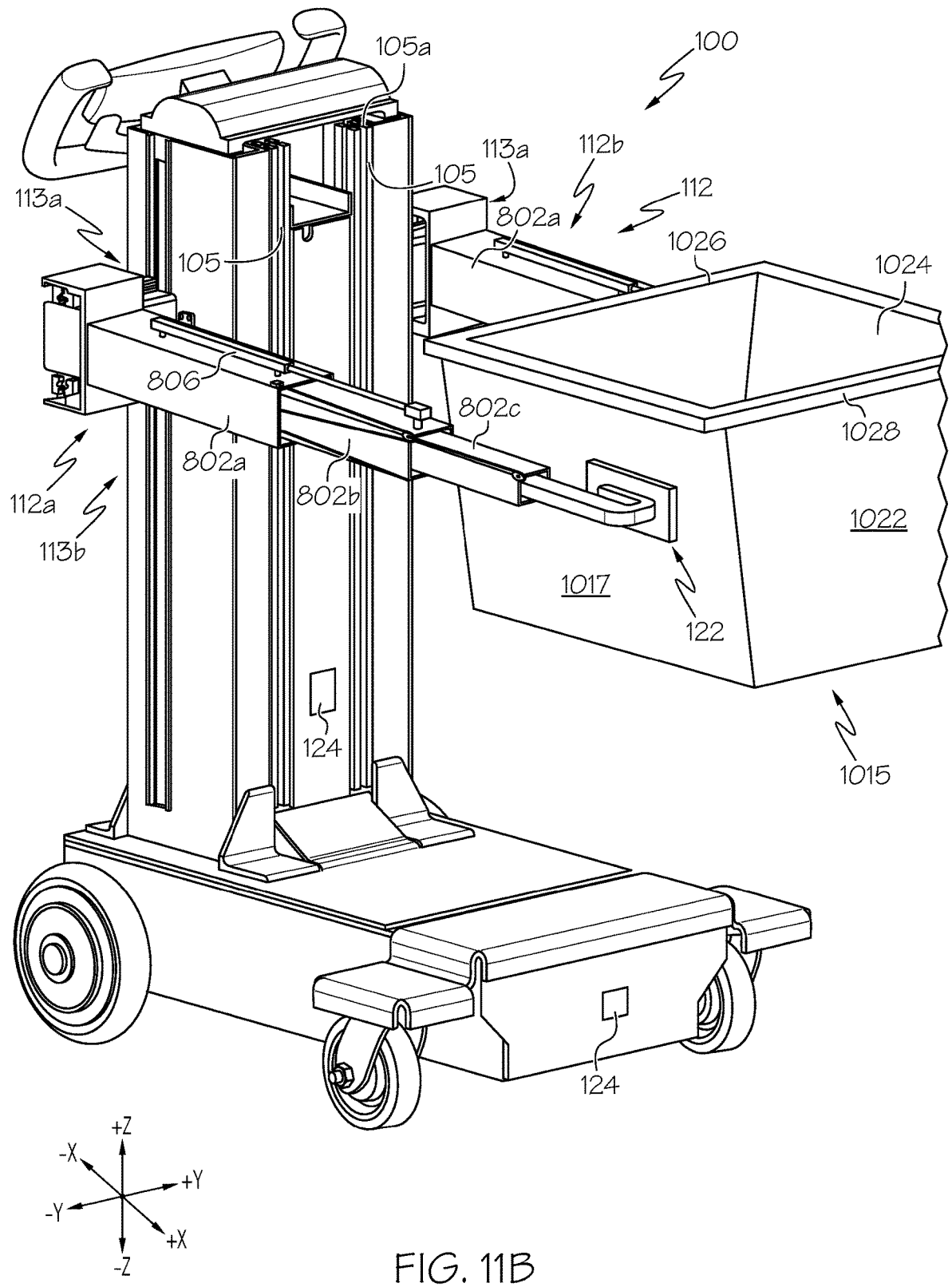
FIG. 11B depicts a perspective view of the illustrative assistive robot system of FIG. 11A raising the container in the system vertical direction according to one or more embodiments shown and described herein.

Now referring to FIG. 11B, the assistive robot system 100 is schematically depicted as raising the container 1015 in the system vertical direction (i.e., in the +/−Z direction) from the floor to a raised position. It should be appreciated the while the lateral telescoping portion is depicted at one position, this is non-limiting and the lateral telescoping assembly 113a of the example movable arm assembly 112 may be moved (i.e. extended or retracted) to any position in the system lateral direction (i.e. in the +/−Y direction). Further, It should be appreciated the while the longitudinal telescoping assembly 113b of the example movable arm assembly 112 is depicted in one position, this is non-limiting and the longitudinal telescoping assembly 113b of the example movable arm assembly 112 may be moved (i.e. extended or retracted) to any position in the system longitudinal direction (i.e. in the +/−X direction).

Figure 11C:
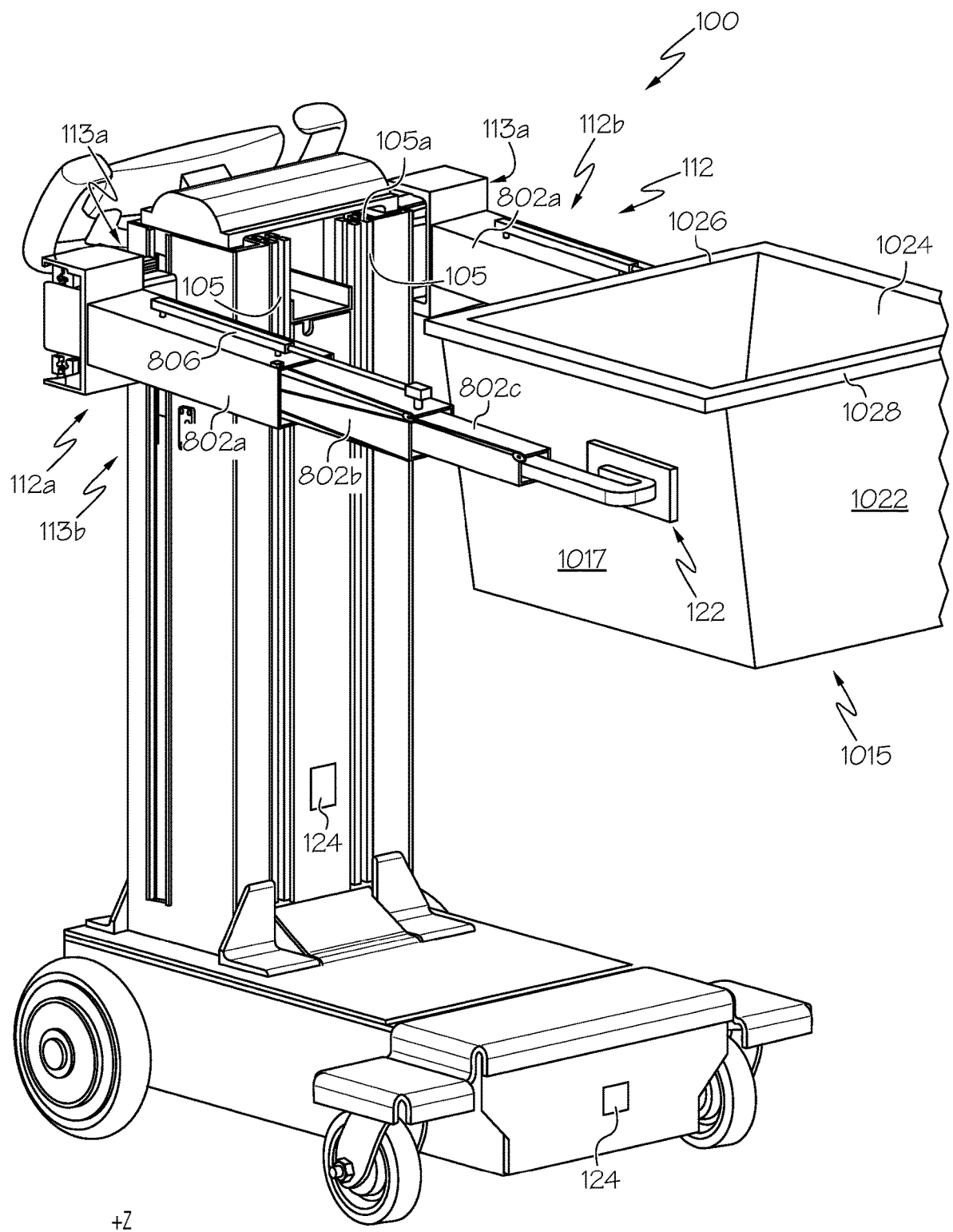
FIG. 11C depicts a perspective view of the illustrative assistive robot system of FIG. 11A extending the container in the system longitudinal direction according to one or more embodiments shown and described herein.

Now referring to FIG. 11C, the assistive robot system 100 is schematically depicted as raising and extending the container 1015 in the system vertical direction (i.e., in the +/−Z direction) and in the system longitudinal direction (i.e., in the +/−X direction). It should be appreciated that the container is moved by moving the lifting mechanism 101 in the system vertical direction (i.e., in the +/−Z direction) and extending the longitudinal telescoping assembly 113b of the example movable arm assembly 112 in the system longitudinal direction (i.e., in the +/−X direction). It should also be appreciated the while the longitudinal telescoping assembly 113b of the example movable arm assembly 112 is depicted as being extended to the second position X2 (FIG. 8A), this is non-limiting and the longitudinal telescoping assembly 113b of the example movable arm assembly 112 may be extended or retracted to any position in the system longitudinal direction (i.e. in the +/−X direction). Further, it should also be appreciated that while the lifting mechanism 101 of the assistive robot system 100 is depicted as being retracted, this is non-limiting and the lifting mechanism 101 may be extended or retracted to any position in the system vertical direction (i.e. in the +/−Z direction). In some embodiments, the positioning or extending of the container 1015 by the movement of the longitudinal telescoping assembly 113b of the example movable arm assembly 112 and/or the lifting mechanism 101 is based on the size of the container 1015, the location of the assistive robot system 100, the location of the container 1015, and the like.

Figure 11D:
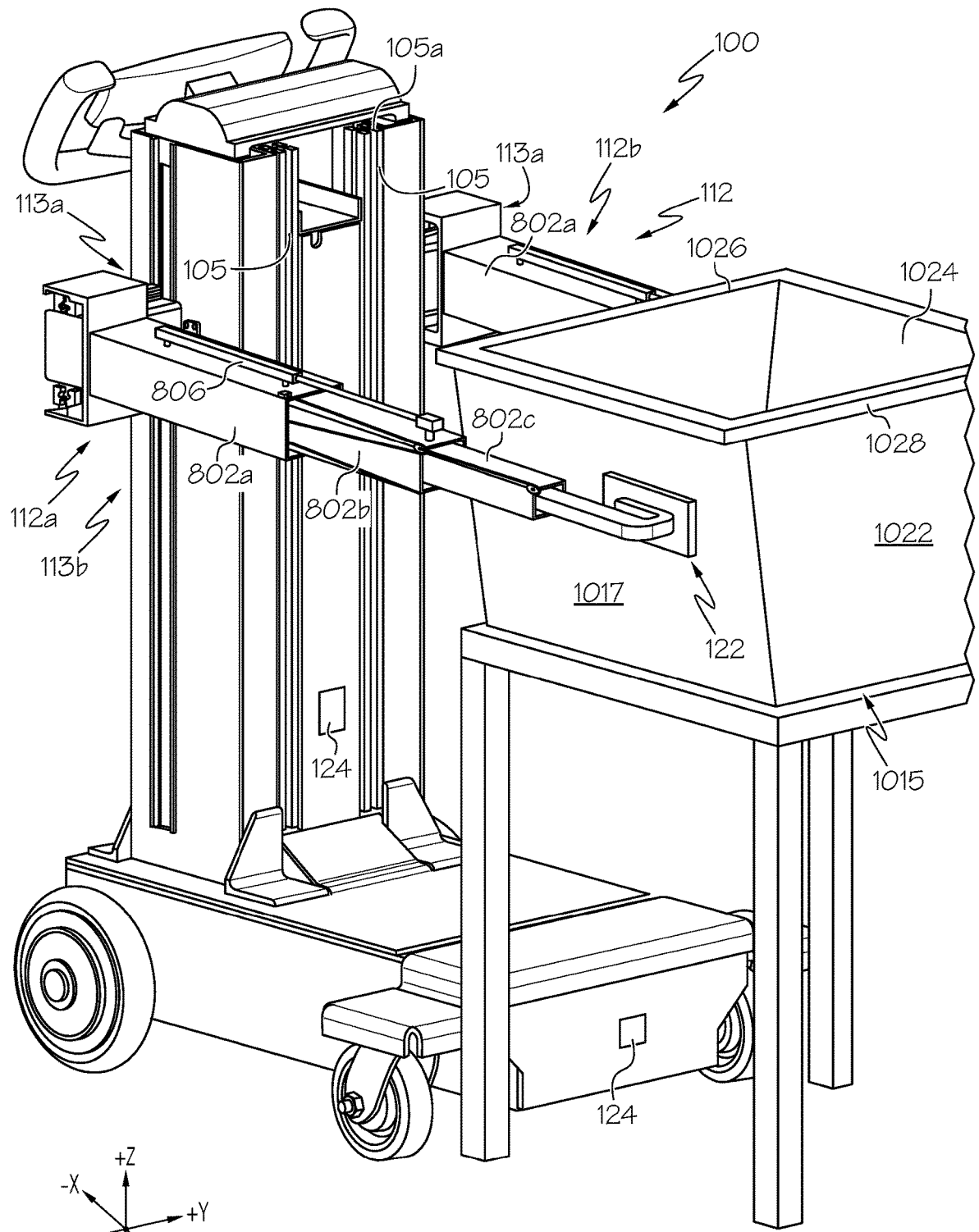
FIG. 11D depicts a perspective view of the illustrative assistive robot system of FIG. 11A releasing the container according to one or more embodiments shown and described herein.

Now referring to FIG. 11D the assistive robot system 100 is schematically depicted as releasing the container 1015 at a drop off location. It should be appreciated that the container is moved to the drop off location by moving the lifting mechanism 101 in the system vertical direction (i.e., in the +/−Z direction) and moving the longitudinal telescoping assembly 113b of the example movable arm assembly 112 in the system longitudinal direction (i.e., in the +/−X direction). It should also be appreciated the container is released from the movable arm assembly 112 by moving the lateral telescoping assembly 113a in the system lateral direction (i.e., in the +/−Y direction). While the lateral telescoping assembly 113a of the example movable arm assembly 112 is depicted as being extended to the second position Y2 (FIG. 7B), this is non-limiting and the lateral telescoping assembly 113a of the example movable arm assembly 112 may be extended or retracted to any position in the system lateral direction (i.e. in the +/−Y direction). In some embodiments, the positioning or releasing of the container 1015 by the movement of the lateral telescoping assembly 113a of the example movable arm assembly 112 is based on the size of the container 1015, the location of the assistive robot system 100, and the like.

Figure 12A:
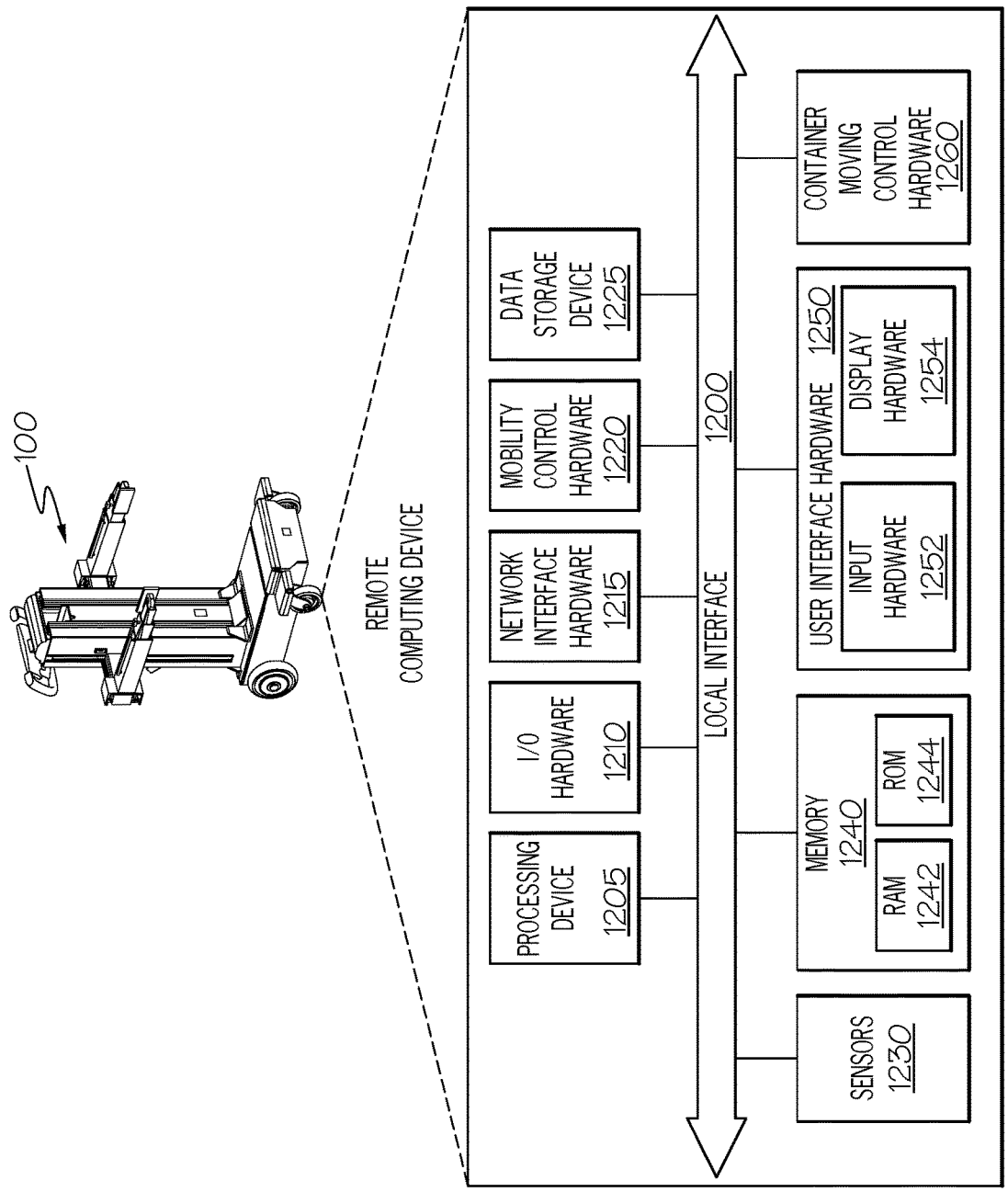
FIG. 12A schematically depicts an illustrative memory component containing illustrative logic components according to one or more embodiments shown and described herein.

Now referring to FIGS. 2 and 12A-12C, in various embodiments, the user interface device 135 and the display 140 may be integrated with one or more additional hardware components within the assistive robot system 100. FIG. 12A schematically depicts illustrative hardware components of the assistive robot system 100 that may be used to provide the functionality of the assistive robot system 100, as described herein.

The assistive robot system 100 may have a non-transitory computer-readable medium containing one or more programming instructions for completing the various processes described herein, which may be embodied as hardware, software, and/or firmware, according to embodiments shown and described herein. While in some embodiments the various components of the assistive robot system 100 may be configured as a general purpose computer with the requisite hardware, software, and/or firmware, in other embodiments, the various components of the assistive robot system 100 may also be configured as a special purpose computer designed specifically for performing the functionality described herein.

As also illustrated in FIG. 12A, the assistive robot system 100 may include a processing device 1205, I/O hardware 1210, network interface hardware 1215, mobility control hardware 1220, a data storage device 1225, one or more sensors 1230, a non-transitory memory component 1240, user interface hardware 1250, and container moving control hardware 1260. A local interface 1200, such as a bus or the like, may interconnect the various components.

The processing device 1205, such as a computer processing unit (CPU), may be the central processing unit of the assistive robot system 100, performing calculations and logic operations to execute a program. The processing device 1205, alone or in conjunction with the other components, is an illustrative processing device, computing device, processor, or combination thereof. The processing device 1205 may include any processing component configured to receive and execute instructions (such as from the data storage device 1225 and/or the memory component 1240).

The memory component 1240 may be configured as a volatile or a nonvolatile non-transitory computer-readable medium and, as such, may include random access memory 1242 (including SRAM, DRAM, and/or other types of random access memory), read only memory (ROM) 1244, flash memory, registers, compact discs (CD), digital versatile discs (DVD), and/or other types of storage components. The memory component 1240 may include one or more programming instructions thereon that, when executed by the processing device 1205, cause the processing device 1205 to complete various processes, Still referring to FIG. 12A, the programming instructions stored on the memory component 1240 may be embodied as a plurality of software logic modules, where each logic module provides programming instructions for completing one or more tasks, as described in greater detail below with respect to FIG. 12B.

The network interface hardware 1215 may include any wired or wireless networking hardware, such as a modem, LAN port, wireless fidelity (Wi-Fi) card, WiMax card, mobile communications hardware, and/or other hardware for communicating with other networks and/or devices, including the vehicle to which the assistive robot system 100 is coupled, as described herein.

The data storage device 1225, which may generally be a storage medium, may contain one or more data repositories for storing data that is received and/or generated. The data storage device 1225 may be any physical storage medium, including, but not limited to, a hard disk drive (HDD), memory, removable storage, and/or the like. While the data storage device 1225 is depicted as a local device, it should be understood that the data storage device 1225 may be a remote storage device, such as, for example, a server computing device, cloud based storage device, or the like. Illustrative data that may be contained within the data storage device 1225 is described below with respect to FIG. 12C.

Still referring to FIG. 12A, the I/O hardware 1210 may communicate information between the local interface 1200 and one or more other components of the assistive robot system 100. For example, the I/O hardware 1210 may act as an interface between the various components described with respect to FIG. 12A and other components of the assistive robot system 100, such as one or motors or devices that drive movement and/or steering of the wheels 125. Still referring to FIG. 12A, the I/O hardware 1210 may be utilized to transmit one or more commands to the other components of the assistive robot system 100 in some embodiments.

The user interface hardware 1250 may include various hardware components for communicating with a user of the assistive robot system 100, such as, for example, input hardware 1252, and display hardware 1254. The input hardware 1252 may include devices such as, for example, a keyboard, a mouse, a joystick, a camera, a touch screen, a microphone, a wireless remote control device, and/or another device for receiving inputs from a user. The display hardware 1254 may include devices such as a video card, a monitor, and/or another device for sending and/or presenting visual data to a user. The display hardware 1254 may also incorporate audio output hardware or the like that generates and presents audible data to a user, such as spoken words, tones, and/or the like. It should be understood that the user interface hardware 1250 may be integrated with the user interface device 135 and the display 140 described herein with respect to FIG. 5.

Still referring to FIGS. 2 and 12A, the mobility control hardware 1220 may be one or more hardware components for controlling movement of the various components of the assistive robot system 100, such as movement and steering of the wheels 125. Such hardware components may generally be configured to generate and transmit one or more signals to one or more motors coupled to the wheels 125 to effect movement of the wheels 125 or the like.

The one or more sensors 1230 may generally include the various sensors described herein, including the sensors included within the sensor device 124. The sensors 1230 may receive sensed information and transmit signals and/or data corresponding to the sensed information to one or more components described herein. For example, the sensors 1230 may receive images and/or image data via the sensor device 124 and generate one or more signals and/or data to transmit to the processing device 1205 for processing the data and determining control of the assistive robot system 100 for maneuvering the assistive robot system 100, as described in greater detail herein.

The container moving hardware 1260 may generally include one or more components for controlling movement of the movable arm assembly 112 such as an upward and downward movement thereof, an extending and retracting movement thereof, and/or a lateral widening or reducing movement thereof. Further, the movement may be controlled for the first tower actuator assembly 102 such as an upward and downward movement thereof. Such hardware may transmit signals to the actuator 704 (FIGS. 7A-7B), the actuator 804 (FIGS. 9A-9C), the linear actuator 806, and the lifting mechanism 101, which move accordingly.

Figure 12B:
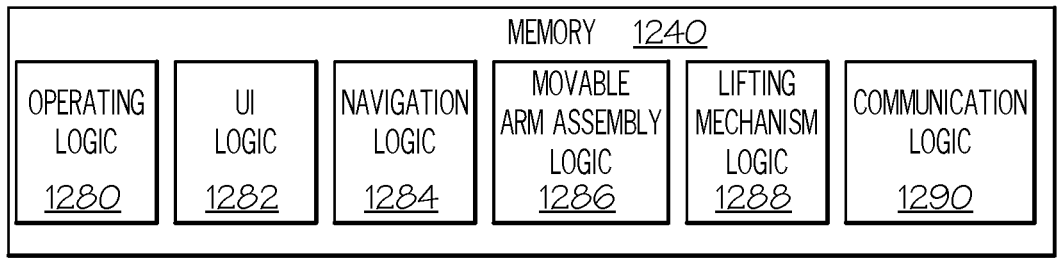
FIG. 12B schematically depicts an illustrative memory component device containing illustrative logic modules according to one or more embodiments shown and described herein FIG. 12C schematically depicts an illustrative data storage device containing illustrative data components according to one or more embodiments shown and described herein.

The program instructions contained on the memory component 1240 (including the RAM 1242 and the ROM 1244) may be embodied as a plurality of software modules, where each module provides programming instructions for completing one or more tasks. For example, FIG. 12B schematically depicts the memory component 1240 containing illustrative logic components according to one or more embodiments shown and described herein. As shown in FIG. 12B, the memory component 1240 may be configured to store various processing logic, such as, for example, operating logic 1280, user interface (UI) logic 1282, navigation logic 1284, movable arm assembly logic 1286, lifting mechanism logic 1288, and/or communication logic 1290 (each of which may be embodied as a computer program, firmware, or hardware, as an example). The operating logic 1280 may include an operating system and/or other software for managing components of the assistive robot system 100 such as determining pose data of the assistive robot system 100 including the robot itself, the location of the movable arm assembly 112, the location of the lifting mechanism 101, and the like. The UI logic 1282 may include one or more programming instructions for providing a user interface to a user and receiving commands from the user. The navigation logic 1284 may include one or more programming instructions for directing movement of the assistive robot system 100, including autonomous and semiautonomous movement around a space, and/or the like, as described in greater detail herein. The movable arm assembly logic 1286 may include one or more programming instructions for directing movement of each arm 112a, 112b of the assistive robot system 100, including autonomous and semiautonomous movement to grip a container, extend a container, place a container, and/or the like, as described in greater detail herein. The lifting mechanism logic 1288 may include one or more programming instructions for directing movement of the first and second tower actuator assemblies 102, 104 and the telescoping sections, including autonomous and semiautonomous movement to raise and lower the movable arm assembly, with and without a container, and/or the like, as described in greater detail herein. The communications logic 1290 may include one or more programming instructions for communicating between the various components of the assistive robot system 100, recognizing the objects via the sensor device 124, radio frequency (RF) identification, optical imaging, and/or the like.

Figure 12C:
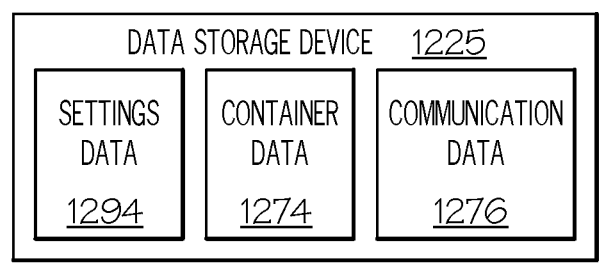

FIG. 12C schematically depicts a block diagram of various data contained within a storage device (e.g., the data storage device 1225) of a computing device and/or a vehicle component according to one or more embodiments shown and described herein. As shown in FIG. 12C, the data storage device 1225 may include, for example, settings data 1272, container data 274, and/or communication data 1276. Settings data 1272 may include, for example, data associated with particular user settings for the assistive robot system 100, such as UI preferences settings, control preferences settings, and/or the like. Container data 1274 may generally refer to a database of information relating to a plurality of containers that the assistive robot system 100 may pick-up, place somewhere, store, and/or generally transport about a space. Communication data 1276 may generally be data that corresponds to communications between the various components and/or the type of container, and/or the like. For example, the communications data 1276 may include pose data for the assistive robot system 100 including the robot itself, the location of the movable arm assembly 112, the location of the lifting mechanism 101, and the like.

It should be understood that the components illustrated in FIGS. 12A-12C are merely illustrative and are not intended to limit the scope of this disclosure. More specifically, while the components in FIGS. 12A-12C are illustrated as residing within the assistive robot system 100, this is a nonlimiting example. In some embodiments, one or more of the components may reside external to the assistive robot system 100.

As mentioned above, the various components described with respect to FIGS. 12A-12C may be used to carry out one or more processes and/or provide functionality for moving the assistive robot system 100, for guiding the movable arm assembly 112 of the assistive robot system 100, for raising and/or lowering the container via the lifting mechanism 101, for grasping or releasing of containers, and for receiving user inputs. An illustrative example of the various processes are described with respect to FIGS. 13-15 hereinbelow.

Figure 13:
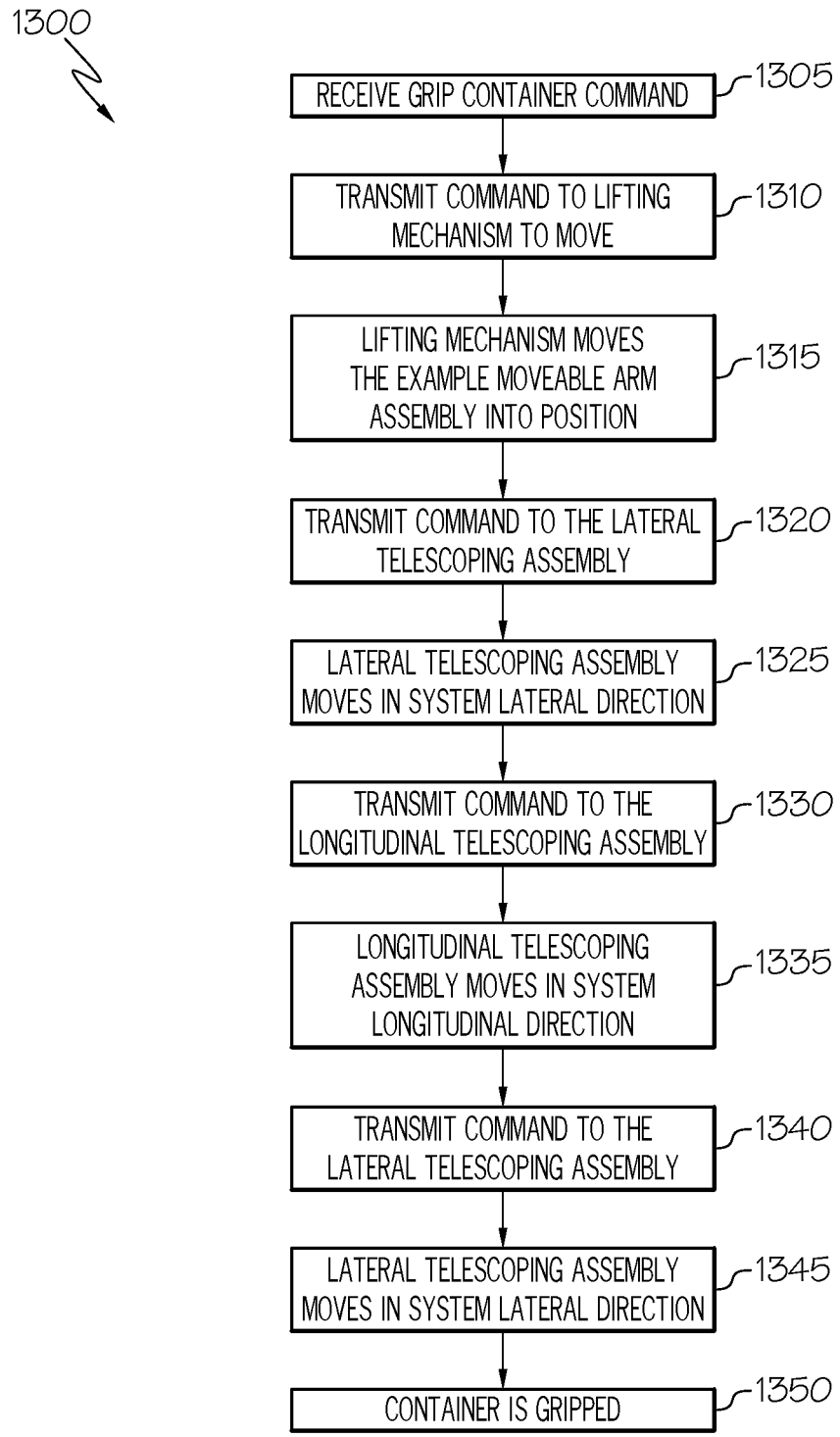
FIG. 13 depicts a flow diagram of an illustrative method of gripping a container according to one or more embodiments shown and described herein.
Figure 14:
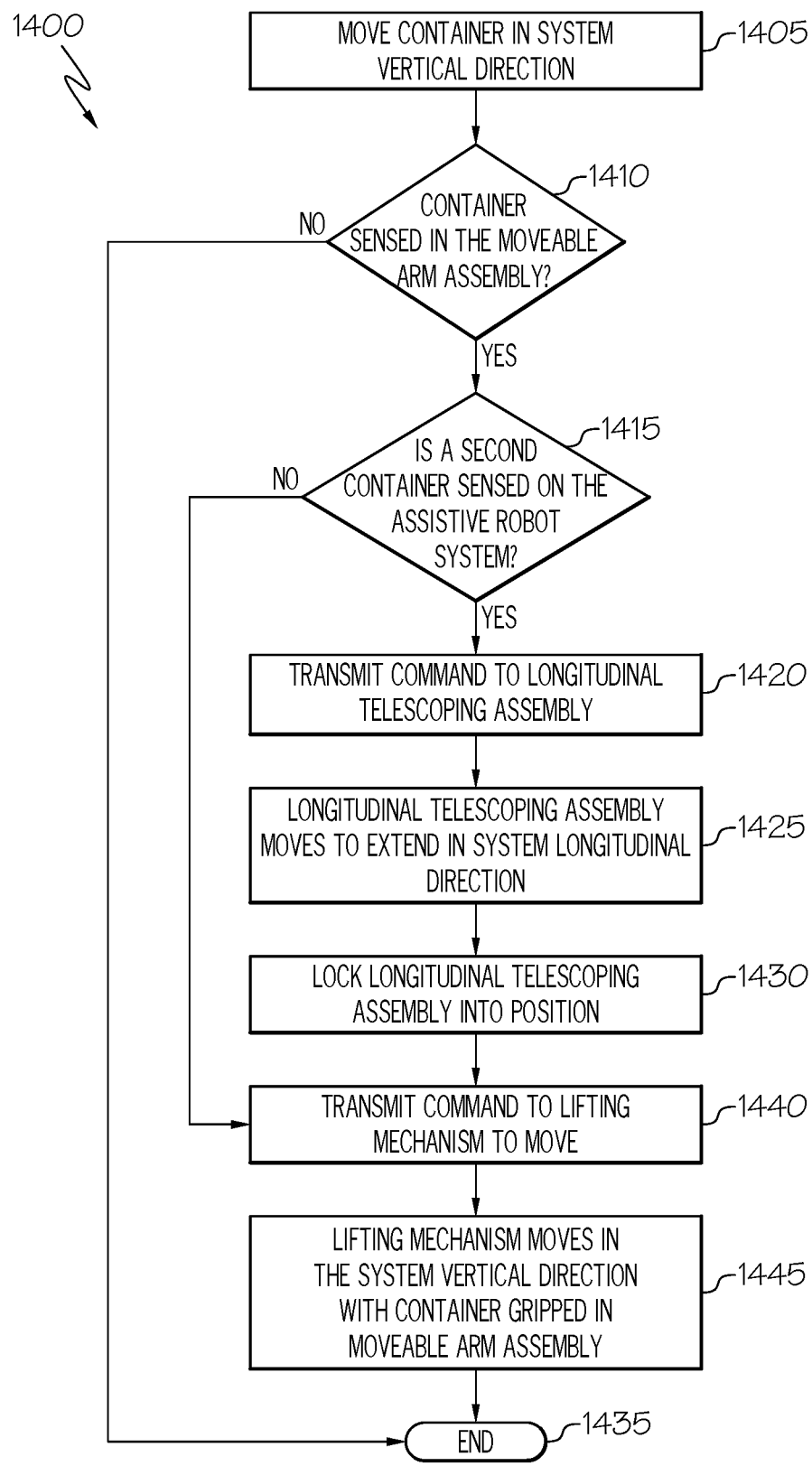
FIG. 14 depicts a flow diagram of an illustrative method of moving a container in the system vertical direction according to one or more embodiments shown and described herein.
Figure 15:
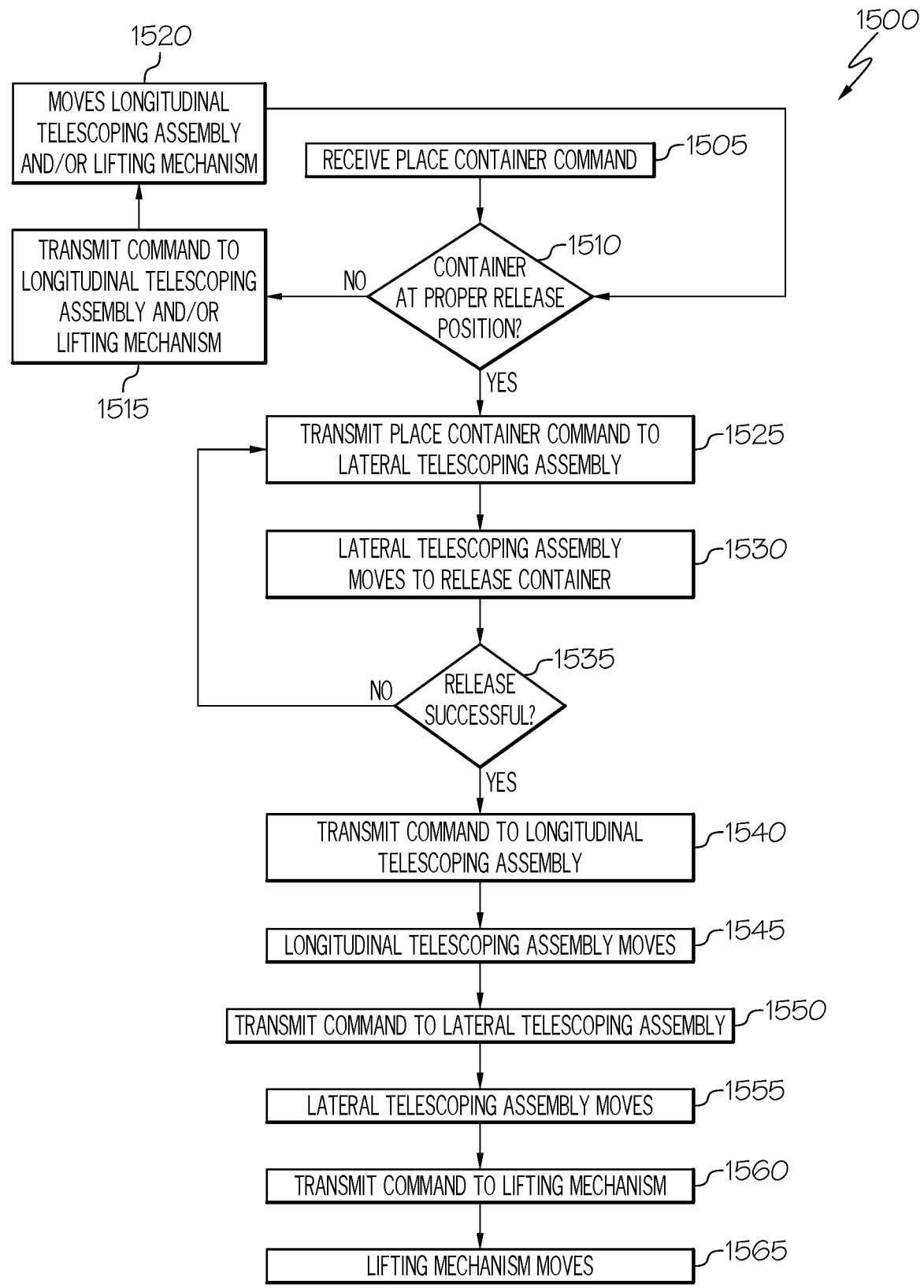
FIG. 15 depicts a flow diagram of an illustrative method of placing a container according to one or more embodiments shown and described herein.

FIGS. 13-15 depict various non-limiting processes that may be completed by the assistive robot system 100 and/or one or more components thereof for autonomous or semi-autonomous operation of the assistive robot system 100 (FIG. 1). The various processes described with respect to FIGS. 13-15 may generally be completed by the assistive robot system or a component thereof, such as, for example, the processing device 1205 (FIG. 12A). FIG. 13 depicts an illustrative method of gripping a container, generally designated 1300, according to some embodiments. The various steps described with respect to FIG. 13 are merely illustrative, and additional, fewer, or alternative steps are contemplated without departing from the scope of the present disclosure. In addition, the steps described with respect to FIG. 13 are generally completed when the assistive robot system is gripping the container.

At block 1305, a grip container command may be received. The grip container command may be received via the user interface of the assistive robot system, may be received via a remote control device that transmits a wireless signal to the assistive robot system, and/or the like. It should be appreciated that the phrase "grip container" may also be understood to mean "engage container." Upon receiving such a command, a command may then be transmitted to the lifting mechanism at block 1310 to cause the example movable arm assembly to move into a position similar to the height in the system vertical direction (i.e., in the +/-Z direction) as the pair of sidewalls of the container to be gripped at block 1315.

Thereafter, a command is transmitted to the lateral telescoping assembly, at block 1320, to cause the example movable arm assembly to move in the system lateral direction (i.e., in the system +/-Y direction), if required, such that the example movable arm assembly has a width that is larger than the pair of sidewalls of the container to be gripped, at block 1325. For example, if the width of the container is 400 millimeters in the system lateral direction (i.e., in the +/-Y direction), the lateral telescoping assembly may extend 430 millimeters in the system lateral direction (i.e., in the system +/-Y direction) such that the example gripper assembly is wider than the container in the system lateral direction (i.e., in the +/-Y direction). It should be appreciated that this is merely an example and that the distances may vary. Further, it should be appreciated that the distances may be determined automatically by the sensing device or manually by a user controlling the lateral telescoping assembly via the user interface.

Thereafter, a command is transmitted to the longitudinal telescoping assembly, at block 1330, to move in the system longitudinal direction (i.e., in the system +Z direction) such that the example movable arm assembly moves, if required, to align the example gripping assembly with the pair of sidewalls of the container to be gripped at block 1335. For example, if the container is 400 millimeters in front of the base of assistive robot system in the system longitudinal direction (i.e., in the +/-X direction), the longitudinal telescoping assembly may extend 430 millimeters in the system longitudinal direction (i.e., in the system +/-X direction) such that the example gripping assembly is aligned with the sidewalls of the container. It should be appreciated that this is merely an example and that the distances may vary. Further, it should be appreciated that the distances may be determined automatically by a sensing device or manually by a user controlling the longitudinal telescoping assembly via the user interface. Moreover, while not specifically described in FIG. 13, the assistive robot system may, depending on the distance of the container, transmit a signal to the drive mechanism (e.g., the one or more motors) to cause the wheels to move (i.e., towards or away from the container), thereby positioning the assistive robot system in a position so to grip the container. In another example, a signal may be transmitted to a user interface device such that the user interface device displays a command to a user that instructs the user to push or pull the assistive robot system towards or away from the container so to position the longitudinal telescoping assembly into the proper gripping position.

Once the longitudinal telescoping assembly is in position, a command is transmitted to the lateral telescoping assembly, at block 1340, to cause the lateral telescoping assembly to move in the system lateral direction (i.e., in the +/-Y direction), at block 1345, such that the example gripping assembly makes contact with, or grips the pair of sidewalls of the container. As such, the container is now gripped by the assistive robot system at block 1350. In some embodiments, confirming that the container is gripped may be verified automatically by the sensing device or manually by a user confirming via the user interface.

FIG. 14 depicts an illustrative method of moving the container in the system vertical direction (i.e., in the +/-Z direction generally designated 1400, according to some embodiments. The various steps described with respect to FIG. 14 are merely illustrative, and additional, fewer, or alternative steps are contemplated without departing from the scope of the present disclosure. In addition, the steps described with respect to FIG. 14 are generally completed when the assistive robot system has gripped the container.

At block 1405, a move container command in the system vertical direction (i.e., in the +/-Z direction) may be received. The move container command may be received via the user interface of the assistive robot system 100, may be received via a remote control device that transmits a wireless signal to the assistive robot system 100, and/or the like. Upon receiving the move container command, a verification may be performed to ensure that the container is gripped within the movable arm assembly at block 1410. The container gripped may be determined automatically by a sensing device or manually by a user confirming via the user interface. If the container is not gripped, the move command is ended at block 1435. If the container is gripped, a verification of whether a second container is stored on the assistive robot system is determined at block 1415. Determining whether there is the second container stored in on the assistive robot system may be automatic by a sensing device or manually by a user confirming via the user interface. Further, it should be appreciated that if the second container is stored on the assistive robot system, the container currently gripped in the movable arm assembly will need to move in the system vertical direction (i.e. in the +/-Z direction) around the second container stored on the assistive robot system. As such, if the second container is stored in the container storage assembly, the longitudinal telescoping section should not retract in the system longitudinal direction (i.e., in the +/-X direction) so to not interfere with the second container stored on the assistive robot system, and may have to extend in the system longitudinal direction (i.e., in the +/-X direction) to provide the necessary clearance to move the container currently gripped in the movable arm assembly out of the way of the second container. When the second container stored on the assistive robot system is sensed, at block 1415, a command is transmitted to the longitudinal telescoping assembly, at block 1420, which in turn causes the longitudinal telescoping assembly to move in the system longitudinal direction (i.e., in the +/-X direction), at block 1425. It should be appreciated that the longitudinal telescoping assembly may move into the mid-position or second position, as directed by the assistive robot system. Once into position, the assistive robot system locks the longitudinal telescoping assembly into that position at block 1430. Next, regardless of whether the second container is present on the assistive robot system, a command may then be transmitted to the lifting mechanism, at block 1440, which causes the lifting mechanism to move in the system vertical direction (i.e., in the +/−Z direction) with the container gripped in the movable arm assembly, at block 1445. It should be appreciated that the movement of the container may be to place the container onto the assistive robot system, to raise the container into a position similar to the height of the place that the container will be released, lower the container to a height to be released, and the like. It should also be appreciated that the height of the release may be a predetermined height based on the type of container or a preprogrammed selection that may be chosen by the user via the user interface. Further, it should be appreciated that the release height may be determined automatically by the sensing device. Moreover, while not specifically described in FIG. 14, the assistive robot system may, depending on the distance of the release point from the assistive robot system, transmit a signal to the drive mechanism, (e.g., the one or more motors) to cause the wheels to move (i.e., towards or away from the container), thereby positioning the assistive robot system in a position so to release the container. In another example, a signal may be transmitted to a user interface device such that the user interface device displays a command to a user that instructs the user to push or pull the assistive robot system towards or away from the release point so to position the container into the proper releasing position.

FIG. 15 depicts an illustrative method of placing the container, generally designated 1500, according to some embodiments. The various steps described with respect to FIG. 15 are merely illustrative, and additional, fewer, or alternative steps are contemplated without departing from the scope of the present disclosure. In addition, the steps described with respect to FIG. 15 are generally completed when the assistive robot system has released the container.

At block 1505, a place container command may be received. The place container command may be received via the user interface of the assistive robot system, may be received via a remote control device that transmits a wireless signal to the assistive robot system, and/or the like. Upon receiving such a command, a verification may be performed to ensure that the container is at the proper release position at block 1510. The container release position may be determined automatically by the sensing device or manually by a user confirming via the user interface. If the container is not at the proper release position, a command is transmitted to the longitudinal telescoping assembly and/or the lifting mechanism, at block 1515, which in turn causes the longitudinal telescoping assembly and/or the lifting mechanism to move at block 1520. It should be appreciated that the method of blocks 1510-1520 may be performed simultaneously to properly position the container at the proper release position. Moreover, in some embodiments, if the container is not at the proper release position, a signal may be transmitted to the drive mechanism (e.g., the one or more motors) to cause the wheels to move (i.e., away from the container and/or shelf), thereby positioning the assistive robot system in a position neat the release position. In another example, a signal may be transmitted to a user interface device such that the user interface device displays a command to a user that instructs the user to push or pull the assistive robot to the release position.

Once the container is in the proper release position, a place container command is transmitted, at block 1525, that causes the lateral telescoping assembly to move in the system lateral direction (i.e., in the system +/−Y direction) such that the example gripping assembly no longer make contact with, or grips the pair of sidewalls of the container, at block 1530. As such, the container is now released or placed by the assistive robot system. For example, the container may now be placed on a shelf that is higher in the system vertical direction (i.e., in the +/−Z direction) then the height where the container was gripped, placed at a lower position in the system vertical direction (i.e., in the +/−Z direction) and/or placed on the assistive robot system. The release of the container is verified at block 1535. The container release verification may be automatically performed by the sensing device or manually performed by the user confirming via the user interface. If the release of the container was not successful, the place container command may again be transmitted to the lateral telescoping assembly at block 1525 causing the lateral telescoping assembly to again move at block 1530.

If the release was successful, thereafter, a command is transmitted to the longitudinal telescoping assembly at block 1540 that causes the longitudinal telescoping assembly to move such that the example gripping assembly is clear of the container and the place of release, such as the shelf, at block 1545. Moreover, depending on the distance of the container at the release position or the shelf, a signal may be transmitted to the drive mechanism (e.g., the one or more motors) to cause the wheels to move (i.e., away from the container and/or shelf), thereby positioning the assistive robot system in a position away from the container and/or shelf. In another example, a signal may be transmitted to a user interface device such that the user interface device displays a command to a user that instructs the user to push or pull the assistive robot system away from the container and/or the shelf.

A command may then be transmitted to the lateral telescoping assembly at block 1550 causing the lateral telescoping assembly to move in the system lateral direction (i.e., in the system +/−Y direction) such that the lateral telescoping assembly moves at block 1555. A command may then be transmitted to the lifting mechanism, at block 1560, which causes the lifting mechanism to move, at block 1565.

It should now be understood that the robot systems described herein are configured to grip, raise, store, tilt, retrieve, and place containers on surfaces, such as shelves, tables, floors, and the like. The assistive robot systems described herein generally include various components that grip/release containers, move and transport containers, as well as various components that allow for communications to a user while performing the gripping, raising, transporting and placing of containers.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An assistive robotic system for moving a container, the system comprising:
   a lifting mechanism;
   a movable arm assembly coupled to the lifting mechanism via a connector, the movable arm assembly comprises:
      a pair of movable arms, each movable arm of the pair of movable arms comprises a longitudinal telescoping assembly and a lateral telescoping assembly,
      the longitudinal telescoping assembly comprises a plurality of longitudinal telescoping segments configured to extend and retract in the system longitudinal direction, and
      the lateral telescoping assembly comprises a plurality of lateral telescoping segments configured to extend and retract in the system lateral direction;
   a processing device communicatively coupled to the lifting mechanism and the movable arm assembly; and
   a non-transitory, processor-readable storage medium in communication with the processing device, the non-transitory, processor-readable storage medium comprising one or more programming instructions that, when executed, cause the processing device to:
      transmit a command to the lifting mechanism to cause the lifting mechanism to move the movable arm assembly such that the movable arm assembly grips the container,
      transmit a first one or more signals to the movable arm assembly to cause the movable arm assembly to extend in a system longitudinal direction such that the container gripped by the movable arm assembly is positioned at a release location, and
      transmit a second one or more signals to the movable arm assembly to cause the movable arm assembly to move in a system lateral direction such that the container gripped by the movable arm assembly is released from the movable arm assembly at the release location.

2. The system of claim 1, wherein:
   the lifting mechanism further comprises:
      a tower actuator assembly comprising a linkage assembly and a plurality of telescoping sections, the linkage assembly comprising:
         a first actuator;
         a plurality of sprockets, wherein at least one sprocket of the plurality of sprockets is operably connected to the first actuator; and
         a continuous member positioned to operably connect the other plurality of sprockets to the at least one sprocket operably connected to the first actuator; and
   the one or more programming instructions that, when executed, cause the processing device to transmit a command to the lifting mechanism to cause the lifting mechanism to move the plurality of telescoping sections in a system vertical direction such that the container gripped by the movable arm assembly is moved in the system vertical direction.

3. The system of claim 2, wherein:
   the continuous member is routed through the linkage assembly; and
   the continuous member routing permits at least one sprocket of the plurality of sprockets to travel in the system vertical direction to provide movement of the plurality of telescoping sections in the system vertical direction.

4. The system of claim 1, wherein the lateral telescoping assembly further comprises:
   a first lateral segment operably coupled to a second lateral segment, wherein:
      the first lateral segment comprises an attachment end coupled to the connector, and
      the second lateral segment comprises a distal end, the distal end is coupled to a housing;
   a second actuator is attached to the housing;
   a drum rotatably attached to the second actuator; and
   a coiled member comprising a first end and a second end, wherein:
      the first end is attached to a tower actuator assembly and the second end is attached to the drum, and
      the coiled member is configured to coil and uncoil into the drum upon an actuation of the second actuator thereby extending or retracting the second lateral segment.

5. The system of claim 4, wherein the coiled member is a belt, a chain, a lead screw, a rack and pinion, or a rigid chain.

6. The system of claim 1, wherein the longitudinal telescoping assembly further comprises:
   a first longitudinal segment having a first interior area;
   a second longitudinal segment having a second interior area; and
   a third longitudinal segment having a third interior area, wherein the first interior area is larger than the second interior and the third interior area, and the second interior area is larger than the third interior area such that the third longitudinal segment nests into the second interior area of the second longitudinal segment and the second longitudinal segment nests into the first interior area of the first longitudinal segment in a first position.

7. The system of claim 6, wherein the longitudinal telescoping assembly further comprises:
   a linear actuator operably coupled to the first longitudinal segment and the second longitudinal segment;
   a dual pulley system comprising:
      a retract pulley assembly having a retract plurality of pulleys and a retract a pulley member, wherein:
         the retract pulley assembly is operably attached to the first, second and third longitudinal segments, and
         the retract pulley assembly is configured to move the first, second and third longitudinal segments into the first position; and
      an extend pulley assembly having an extend plurality of pulleys and an extend pulley member, the extend pulley assembly operably attached to the first, second and third longitudinal segments, the extend pulley assembly configured to move the first, second and third longitudinal segments into a second position.

8. The system of claim 7, wherein the one or more programming instructions that, when executed, cause the processing device to:
   transmit a first longitudinal segment command to the linear actuator to cause the first, second and third longitudinal segments to move as a single unit in the system longitudinal direction via the extend pulley assembly to the second position.

9. The system of claim 7, wherein the one or more programming instructions that, when executed, cause the processing device to:
   transmit a second command to the linear actuator to cause the second and third longitudinal segments to move as a single unit in the system longitudinal direction via the retract pulley assembly to the first position.

10. The system of claim 7, further comprising:
a gripping assembly comprising an inner surface that is operably connected to the third longitudinal segment and to the dual pulley system, wherein the gripping assembly is configured to move in the system longitudinal direction, and the inner surface of the gripping assembly is configured to grip the container.

11. An assistive robot system comprising:
a lifting mechanism;
a movable arm assembly coupled to the lifting mechanism, the movable arm assembly comprises:
  a pair of movable arms, each movable arm of the pair of movable arms comprises a longitudinal telescoping assembly and a lateral telescoping assembly,
  the longitudinal telescoping assembly comprises a plurality of longitudinal telescoping segments configured to extend and retract in the system longitudinal direction, and
  the lateral telescoping assembly comprises a plurality of lateral telescoping segments configured to extend and retract in the system lateral direction;
a sensor device that senses an area surrounding the assistive robot system; and
a processing device communicatively coupled to the sensor device, the lifting mechanism, and the movable arm assembly,
wherein:
  data is transmitted from the sensor device to the processing device,
  the processing device processes the data and determines one or more movement commands, and
  the processing device transmits one or more signals corresponding to the one or more movement commands to:
    cause the lifting mechanism and the movable arm assembly to move and grip a container,
    cause the movable arm assembly to extend in a system longitudinal direction such that the container gripped within the movable arm assembly is positioned at a release location, and
cause the movable arm assembly to extend in a system lateral direction such that the container gripped within the movable arm assembly is released from the movable arm assembly at the release location.

12. The system of claim 11, wherein:
the lifting mechanism further comprises:
  a tower actuator assembly comprising a linkage assembly and a plurality of telescoping sections, the linkage assembly comprising:
    a first actuator;
    a plurality of sprockets, wherein at least one sprocket of the plurality of sprockets is operably connected to the first actuator, and
    a continuous member positioned to operably connect the other plurality of sprockets to the at least one sprocket operably connected to the first actuator; and
the one or more movement commands that, when executed, cause the processing device to transmit a command to the lifting mechanism to cause the lifting mechanism to move the plurality of telescoping sections in a system vertical direction such that the container gripped within the movable arm assembly is moved in the system vertical direction.

13. The system of claim 12, further comprising:
a drive mechanism; and
one or more wheels are coupled to the drive mechanism that drives movement of the one or more wheels, wherein:
  the processing device is communicatively coupled to the drive mechanism, and
  the processing device transmits one or more signals corresponding to the one or more movement commands to cause the one or more wheels to move such that the drive mechanism operates autonomously or semi-autonomously.

14. The system of claim 11, wherein the lateral telescoping assembly further comprises:
a first lateral segment operably coupled to a second lateral segment, wherein:
  the first lateral segment comprises an attachment end coupled to a connector, and
  the second lateral segment comprises a distal end, the distal end is coupled to a housing;
a second actuator is attached to the housing;
a drum is rotatably attached to the second actuator; and
a coiled member comprising a first end and a second end, wherein:
  the first end is attached to a tower actuator assembly and the second end is attached to the drum, and
  the coiled member is configured to coil and uncoil into the drum upon an actuation of the second actuator thereby extending or retracting the second lateral segment.

15. The system of claim 11, wherein the longitudinal telescoping assembly further comprises:
a first longitudinal segment having a first interior area;
a second longitudinal segment having a second interior area; and
a third longitudinal segment having a third interior area, wherein the first interior area is larger than the second interior and the third interior area, the second interior area is larger than the third interior area such that the third longitudinal segment nests into the second interior area of the second longitudinal segment and the second longitudinal segment nests into the first interior area of the first longitudinal segment in a first position.

16. The system of claim 15, wherein the longitudinal telescoping assembly further comprises:
a linear actuator operably coupled to the first longitudinal segment and the second longitudinal segment;
a dual pulley system comprising:
  a retract pulley assembly having a plurality of retract pulleys and a retract pulley member, wherein:
    the retract pulley assembly is operably attached to the first, second and third longitudinal segments, and
    the retract pulley assembly is configured to move the first, second and third longitudinal segments into the first position; and
  an extend pulley assembly having a plurality of extend pulleys and an extend pulley member, wherein:
    the extend pulley assembly is operably attached to the first, second and third longitudinal segments, and
    the extend pulley assembly is configured to move the first, second and third longitudinal segments into a second position;

wherein the one or more movement commands that, when executed, cause the processing device to:

transmit a first command to the linear actuator to cause the first, second and third longitudinal segments to move as a single unit in the system longitudinal direction via the extend pulley assembly to the second position; and transmit a second command to the linear actuator to cause the first, second and third longitudinal segments to move as a single unit in the system longitudinal direction via the retract pulley assembly to the first position.

17. The system of claim 16, further comprising:
a gripping assembly comprising an inner surface that is operably connected to the third longitudinal segment and to the dual pulley system, wherein the gripping assembly is configured to move in the system longitudinal direction, and the inner surface of the gripping assembly is configured to grip the container.

18. An assistive robotic system for transporting a container, the assistive robotic system comprising:

a drive mechanism comprising a motor;

one or more wheels coupled to the drive mechanism that drives movement of the one or more wheels;

a lifting mechanism coupled to the drive mechanism;

a movable arm assembly coupled to the lifting mechanism, the movable arm assembly comprises:

a pair of movable arms, each movable arm of the pair of movable arms comprises a longitudinal telescoping assembly and a lateral telescoping assembly, the longitudinal telescoping assembly comprises a plurality of longitudinal telescoping segments configured to extend and retract in the system longitudinal direction, and the lateral telescoping assembly comprises a plurality of lateral telescoping segments configured to extend and retract in the system lateral direction;

a processing device communicatively coupled to the lifting mechanism, the movable arm assembly and the drive mechanism; and a non-transitory, processor-readable storage medium communicatively coupled to the processing device, the non-transitory, processor-readable storage medium comprising one or more programming instructions stored thereon that, when executed by the processing device, cause the processing device to:

determine a grip position of the container to receive the movable arm assembly, generate one or more movement commands that corresponds to one or more movements for the drive mechanism, the lifting mechanism and the movable arm assembly wherein the one or more movement commands correspond to the movement command to grip the container, transmit one or more movement commands to the movable arm assembly, the lifting mechanism and the drive mechanism, wherein the one or more movement commands correspond to the movement command to move the container in a system vertical direction, determine a release position of the container, transmit one or more movement commands to the movable arm assembly, the lifting mechanism and the drive mechanism, wherein the one or more movement commands correspond to the movement command to transport the container, and generate at least one movement command to the movable arm assembly, the lifting mechanism and the drive mechanism, wherein the one or more movement commands correspond to the movement command to release the container.

\* \* \* \* \*

UNITED STATES PATENT AND TRADEMARK OFFICE
CERTIFICATE OF CORRECTION

PATENT NO. : 11,597,098 B2
APPLICATION NO. : 16/560400
DATED : March 7, 2023
INVENTOR(S) : Aimee S. Goncalves et al.

It is certified that error appears in the above-identified patent and that said Letters Patent is hereby corrected as shown below:

On the Title Page

Page 2, Column 1, item [56], Line 4, delete "Stabler" and insert --Stahler--, therefor.

In the Specification

In Column 2, Line 24, delete "positon" and insert --position--, therefor.

In Column 8, Line 17, after "pair of", delete "arm" and insert --arms--, therefor.

In Column 9, Line 5, delete "positons" and insert --positions--, therefor.

In Column 17, Line 14, delete "positon" and insert --position--, therefor.

In Column 17, Line 27, delete "positon" and insert --position--, therefor.

In Column 17, Line 62, delete "positon" and insert --position--, therefor.

Signed and Sealed this
Fourth Day of July, 2023

Katherine Kelly Vidal
*Director of the United States Patent and Trademark Office*